Dec. 13, 1955  W. E. PARKINS  2,727,151
CALUTRON RECEIVERS
Filed Feb. 19, 1946  17 Sheets-Sheet 2

INVENTOR.
WILLIAM E. PARKINS
BY
ATTORNEY.

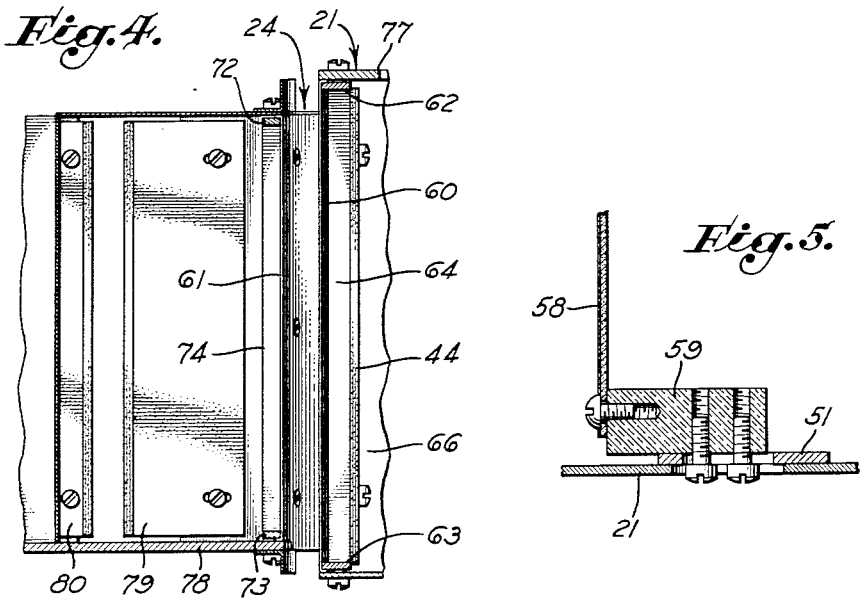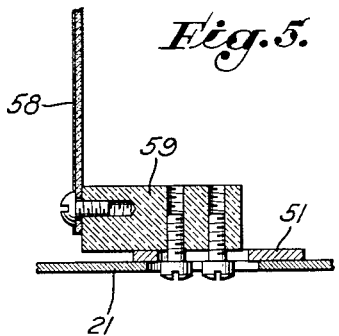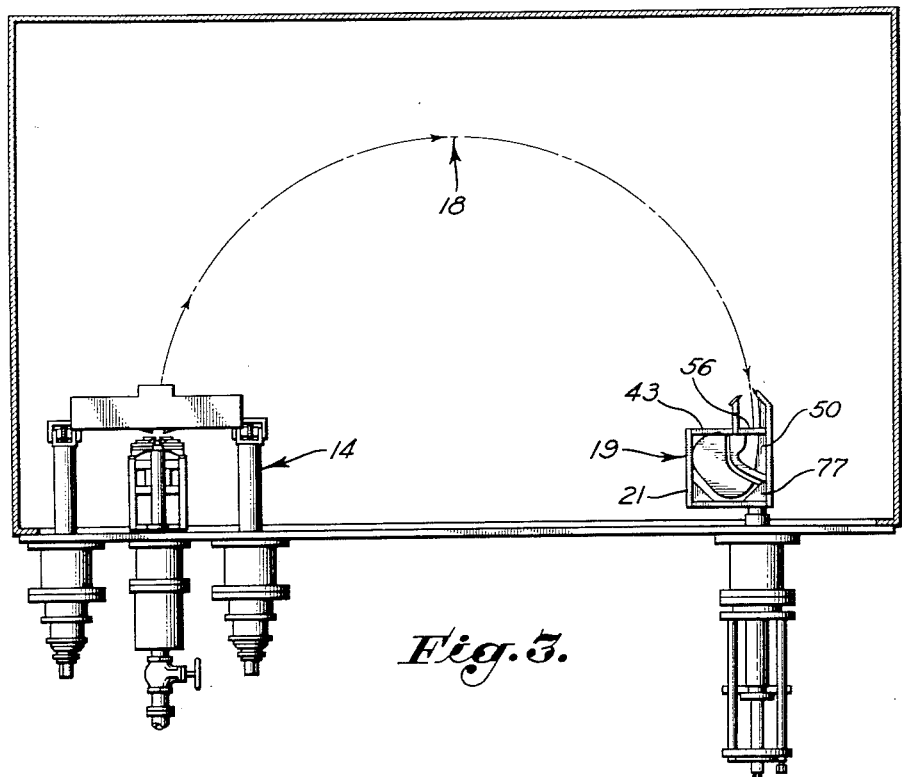

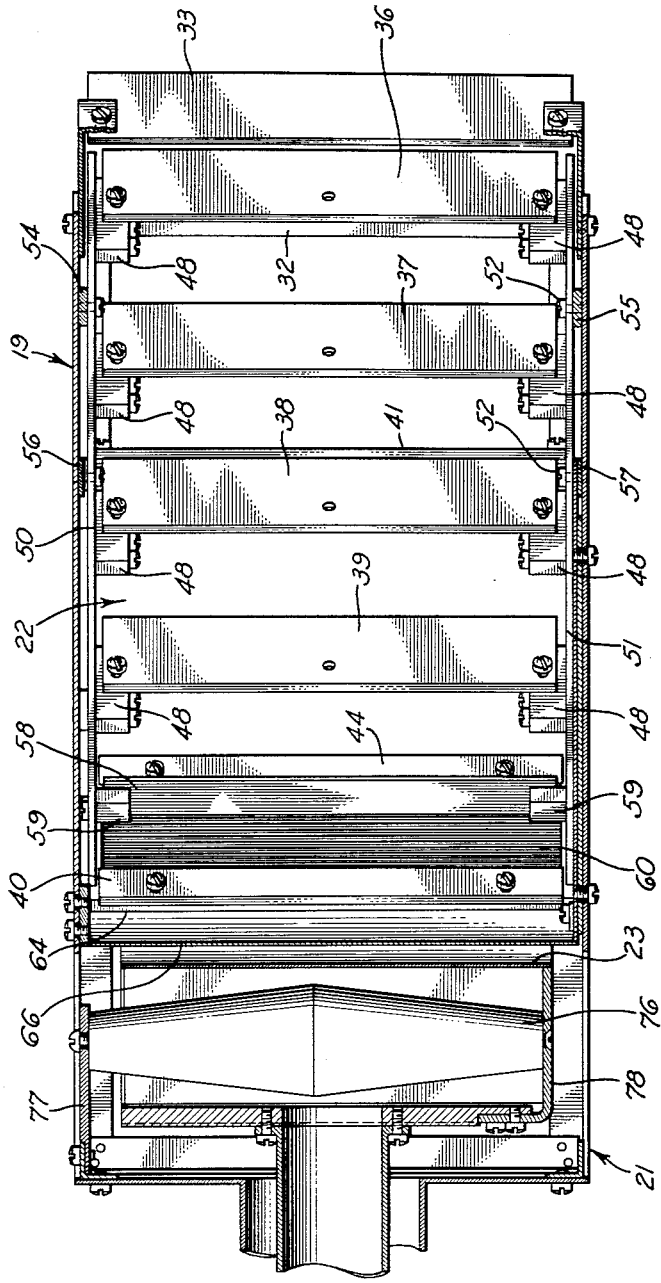

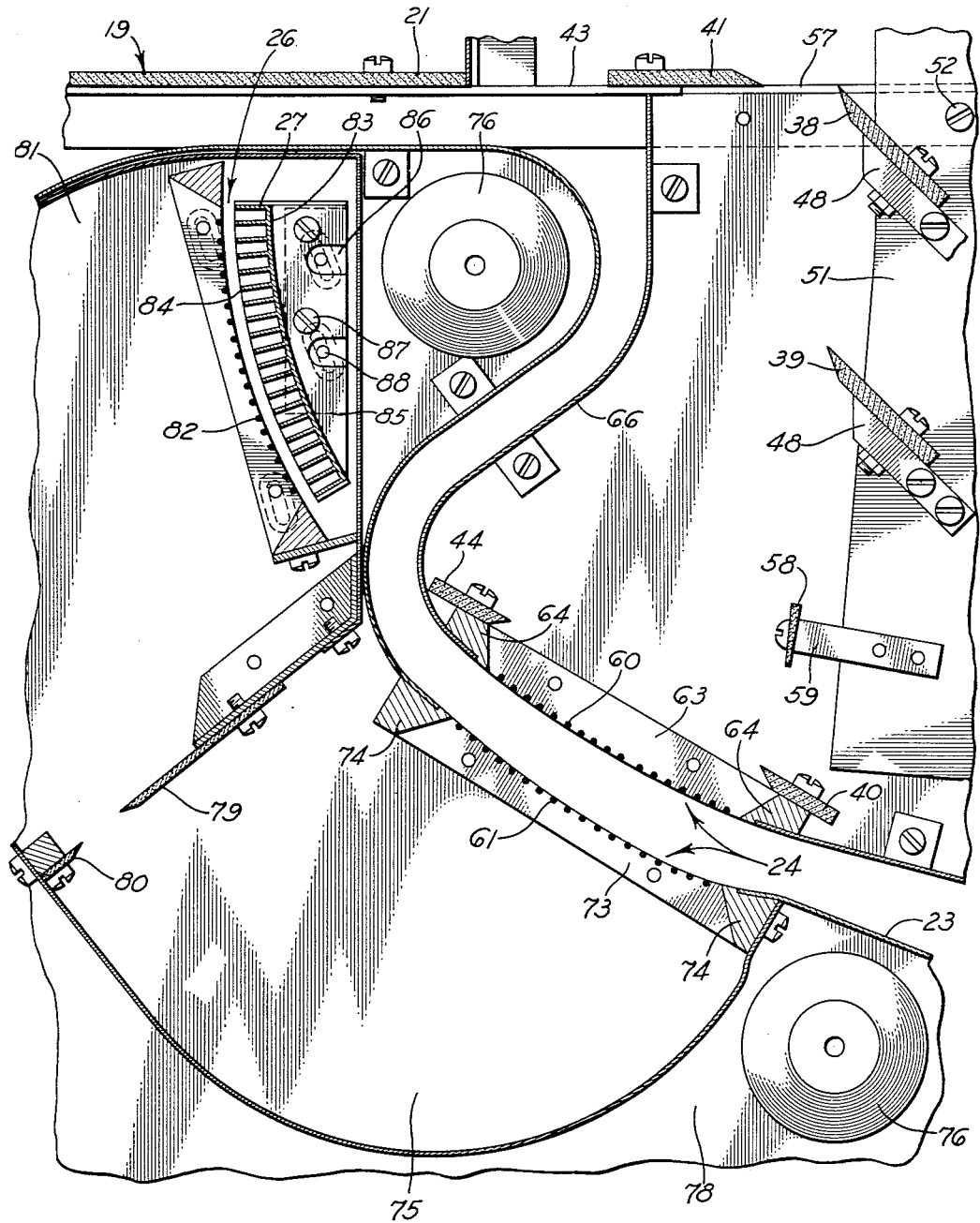

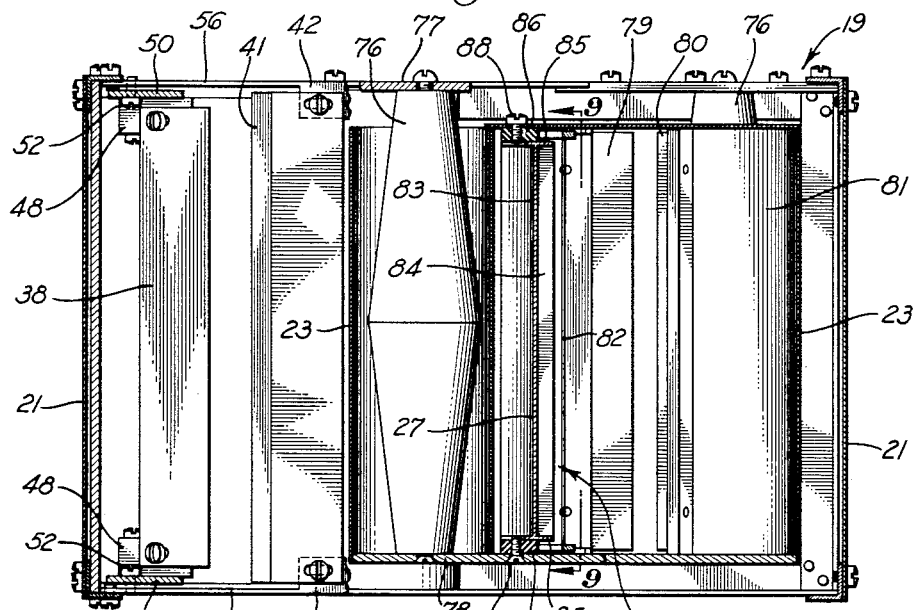
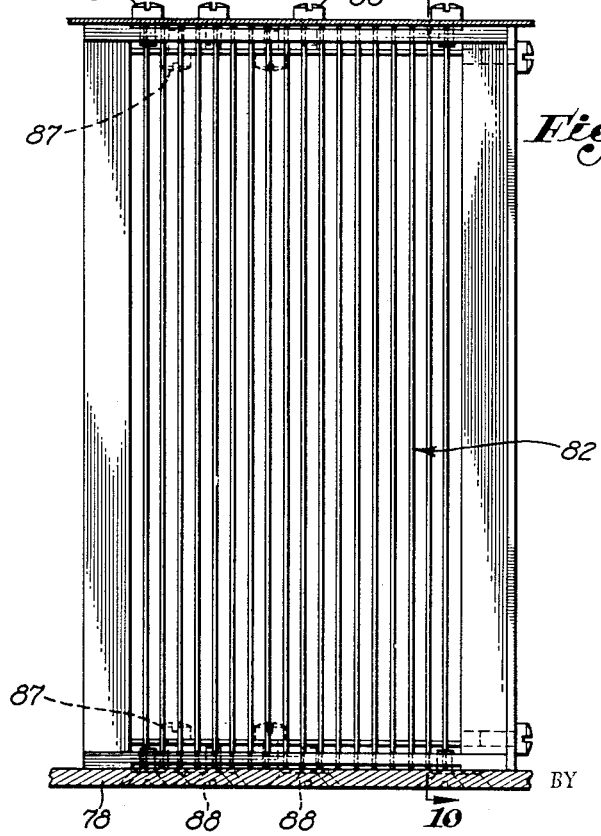
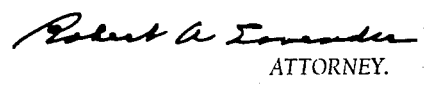

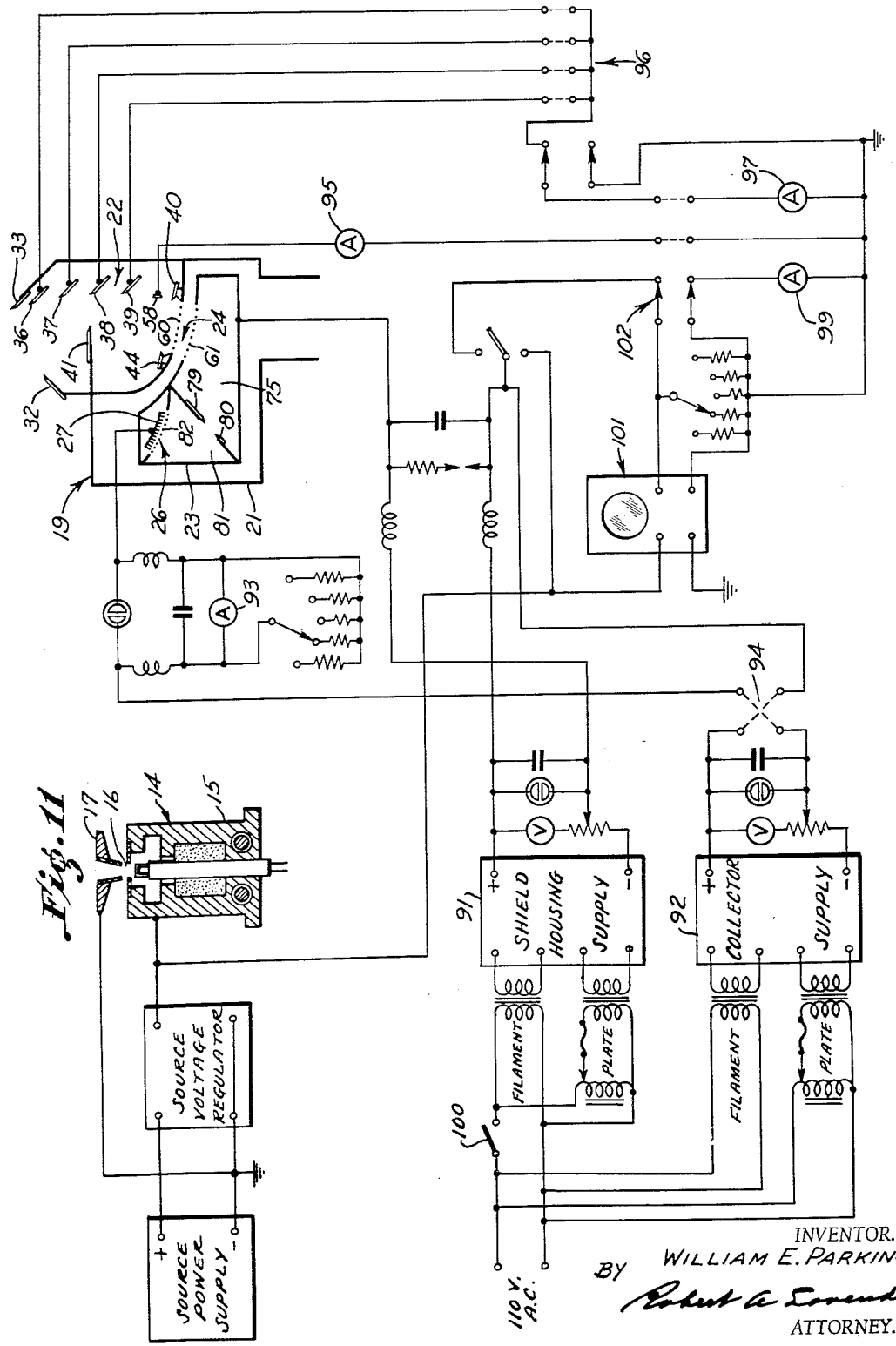

Dec. 13, 1955   W. E. PARKINS   2,727,151
CALUTRON RECEIVERS
Filed Feb. 19, 1946   17 Sheets-Sheet 8

INVENTOR.
WILLIAM E. PARKINS
BY
ATTORNEY.

Dec. 13, 1955  W. E. PARKINS  2,727,151
CALUTRON RECEIVERS
Filed Feb. 19, 1946  17 Sheets-Sheet 9

INVENTOR.
WILLIAM E. PARKINS
BY
ATTORNEY.

Dec. 13, 1955  W. E. PARKINS  2,727,151
CALUTRON RECEIVERS
Filed Feb. 19, 1946  17 Sheets—Sheet 10

INVENTOR.
WILLIAM E. PARKINS
BY
ATTORNEY.

Dec. 13, 1955    W. E. PARKINS    2,727,151
CALUTRON RECEIVERS
Filed Feb. 19, 1946    17 Sheets-Sheet 11
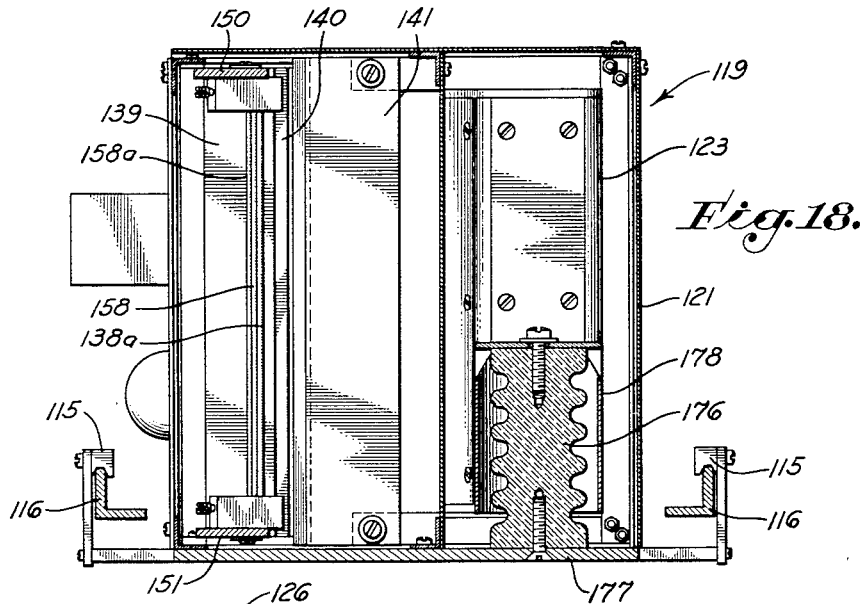
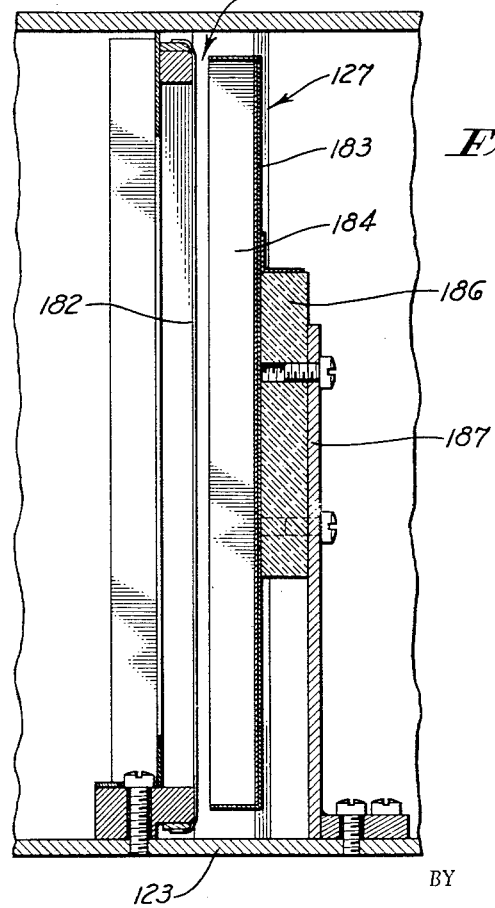
INVENTOR.
WILLIAM E. PARKINS
BY
ATTORNEY.

Dec. 13, 1955　　　　W. E. PARKINS　　　　2,727,151
CALUTRON RECEIVERS

Filed Feb. 19, 1946　　　　　　　　　　　17 Sheets-Sheet 12

INVENTOR.
WILLIAM E. PARKINS
BY
ATTORNEY.

Dec. 13, 1955    W. E. PARKINS    2,727,151
CALUTRON RECEIVERS
Filed Feb. 19, 1946    17 Sheets-Sheet 13

INVENTOR.
WILLIAM E. PARKINS
BY
ATTORNEY.

Dec. 13, 1955  W. E. PARKINS  2,727,151
CALUTRON RECEIVERS
Filed Feb. 19, 1946  17 Sheets-Sheet 15

INVENTOR.
WILLIAM E. PARKINS
BY
ATTORNEY.

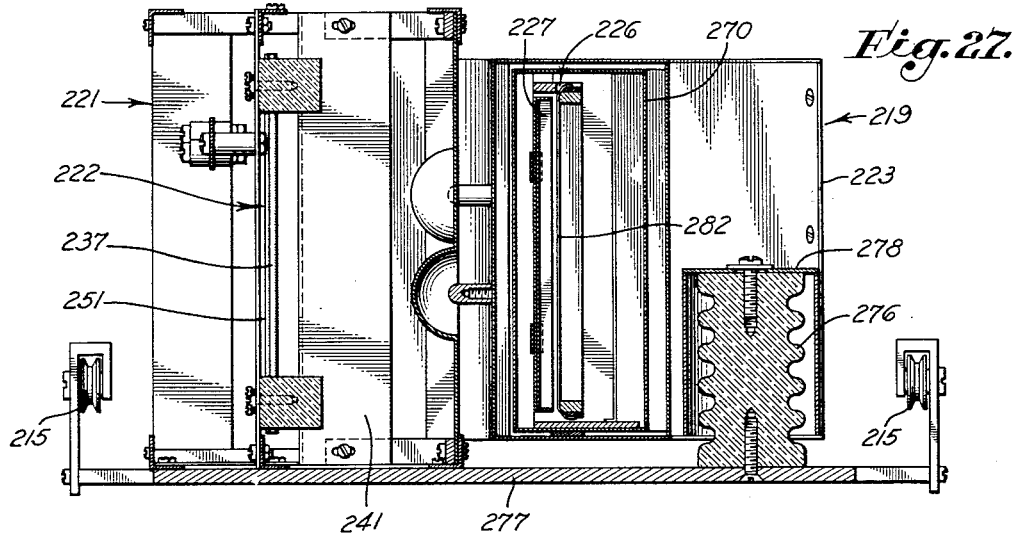
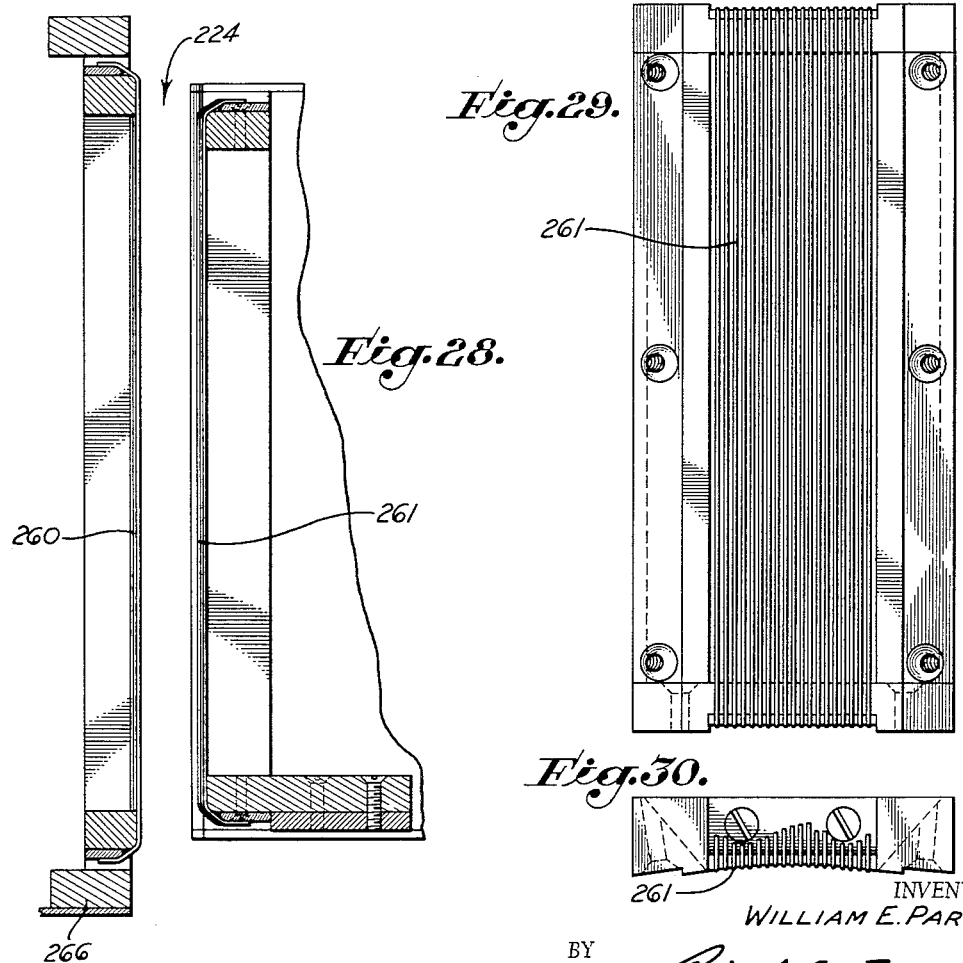

United States Patent Office 2,727,151
Patented Dec. 13, 1955

2,727,151

CALUTRON RECEIVERS

William E. Parkins, Berkeley, Calif., assignor to the United States of America as represented by the United States Atomic Energy Commission Application February 19, 1946, Serial No. 648,798

18 Claims. (Cl. 250—41.9)

The general subject of the invention involves the separation, based on difference in mass, of minute particles, such as atoms, and especially the separation of isotopes of an element, and the collection of a portion of an element enriched with respect to a particular isotope on a scale yielding commercially useful quantities of the collected material.

The type of means or mechanism to which the invention relates is known as a "calutron," and correspondingly the method or process is known as a "calutron" method or process.

In general, the calutron comprises an evacuated tank placed between the poles of an electromagnet so that the evacuated space within the tank is pervaded with a magnetic field of high flux density. Within the tank there is provided a "source" or "source unit" that includes means for supplying the polyisotope as a vapor or gas to an ionizing region, ionizing apparatus for producing positively ionized particles from the vapor, and an accelerating device maintained at a relatively high negative electrical potential with respect to the ionizing apparatus for withdrawing the positive ions. The accelerating device imparts to the positive ions a predetermined energy in the form of substantially uniform velocities along paths generally normal to the direction of the magnetic field and toward a beam defining slit in the accelerating device disposed generally parallel to the direction of the magnetic field.

The accelerated ions travel along arcuate paths having radii that vary with the masses of the particles to form a generally ribbon-shaped beam that diverges through the first 90° of travel from a virtual line focus at the source unit and then converges toward a region of focus approximately 180° from the source unit, beyond which 180° region of focus the ions of the beam again diverge. In this 180° region of focus, the ions are still traveling with their initial velocity, with the exception of those which may have suffered collisions in the beam or which for some reason may not have attained full energy in passing through the accelerating system. The full energy ions are difficult to collect, as they will scatter upon striking a surface, and any deposited ions will be sputtered off by other ions subsequently striking them. In addition, when it is desired to collect an isotope of relatively small mass, ions of an isotope of heavier mass, which have lost energy, will fall into the desired region of collection for the full energy ions of lesser mass, thus decreasing the enrichment with respect to the isotope desired for collection.

The present invention relates particularly to an ion receiver adapted to be placed in the target region of the calutron for collecting selected ions at less than their full energy after they have been subjected to one or more deceleration steps within the receiver.

It is a general object of the invention to provide improved apparatus and methods for receiving ions in a calutron at less than their full energy.

Another object of the invention is to provide an improved ion receiver unit of the ion decelerating type.

A further object of the invention is to provide an improved ion decelerating receiver unit wherein the ions are subjected to a plurality of decelerating operations.

Another object of the invention is to provide an ion receiver unit of the decelerating type wherein a collector for the ions is disposed out of the paths of deionized neutral particles scattered from beam delimiting parts of the receiver.

A further object of the invention is to provide an improved ion receiver unit of the decelerating type adapted to collect a selected portion of a polyisotopic ion beam with a high factor of enhancement with respect to a desired isotope.

A further object of the invention is to provide an improved electrical circuit arrangement for operation and control of an ion receiver of the decelerating type.

Other objects and advantages of the invention will be apparent from the following description of certain preferred embodiments of the invention illustrated in the accompanying drawings in which Figures 1 to 11 illustrate one embodiment of the invention;

Fig. 3 is a schematic plan view illustrating further details of the arrangement of the source unit and the receiver unit within the calutron tank;

Fig. 4 is a fragmentary sectional view of the receiver unit, the section being taken as indicated by the line 4—4 in Fig. 2;

Fig. 5 is a fragmentary sectional view of one of the vanes of a beam delimiting vane system, the section being taken as indicated by the line 5—5 in Fig. 2;

Fig. 6 is a sectional elevational view of the receiver unit, the section being taken as indicated by the line 6—6 in Fig. 2;

Fig. 7 is an enlarged sectional plan view of a portion of the receiver unit as shown in Fig. 2;

Fig. 8 is another sectional elevtional view of the receiver unit, the section being taken as indicated by the line 8—8 in Fig. 2;

Fig. 9 is an elevational view of one of the grids of the last decelerating means, the view being taken in the direction indicated by the line 9—9 in Fig. 8;

Fig. 10 is a sectional view of the last decelerating means and associated ion collector, the section being taken as indicated by the line 10—10 in Fig. 9; and Fig. 11 is a wiring diagram of the electrical circuit associated with the receiver unit shown in Figs. 1 to 10.

Figs. 16 through 23 illustrate a second embodiment of the invention.

Fig. 16 is a plan view, partially in section, of a receiver unit in which the collector and its associated decelerating grid are positioned substantially 90° along the path of travel of the beam after its first deceleration step;

Fig. 17 is a side elevational view of the receiver unit shown in Fig. 16, certain parts being shown in section to illustrate details of construction;

Fig. 18 is a sectional view of the receiver unit shown in Fig. 16, the section being taken as indicated by the line 18—18 in Fig. 16.

Fig. 19 is a fragmentary sectional view of the receiver unit shown in Fig. 16, the section being taken as indicated by the line 19—19 in Fig. 16;

Fig. 20 is another fragmentary sectional view of the receiver shown in Fig. 16, the section being taken as indicated by the line 20—20 in Fig. 16;

Fig. 21 is an elevational view of a decelerating grid and its mounting structure;

Fig. 22 is a plan view of the grid structure shown in Fig. 21;

Fig. 23 is an enlarged sectional plan view of a portion of Fig. 16.

Figs. 24 through 30 illustrate a third receiver unit embodying the invention.

Fig. 24 is a plan view of the third receiver unit with certain parts shown in section;

Fig. 25 is a side elevtaional view of the receiver unit shown in Fig. 24;

Fig. 26 is an enlarged view of a portion of Fig. 24;

Fig. 27 is a vertical sectional view of the receiver unit shown in Fig. 24, the section being taken as indicated by the line 27—27 in Fig. 24.

Fig. 28 is a fragmentary sectional view of the receiver unit shown in Fig. 24, the section being taken as indicated by the line 28—28 in Fig. 26;

Fig. 29 is an elevational view of one of the grid structures shown in Figs. 24 and 26; and Fig. 30 is a plan view of the grid structure shown in Fig. 29.

Figure 1:
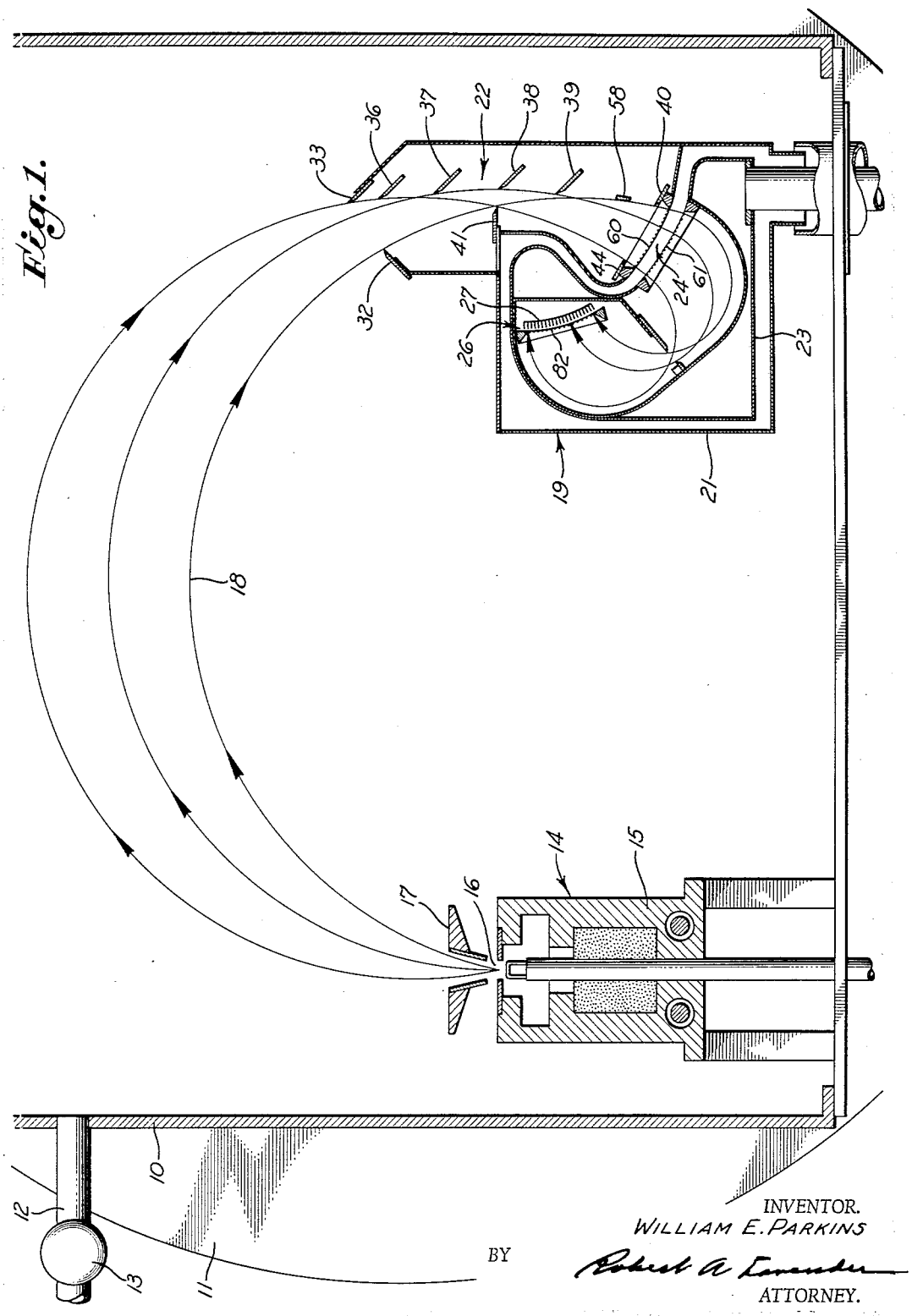
Fig. 1 is a schematic plan view partially in section showing the installation of the receiver unit within the tank of the calutron.
Figure 2:
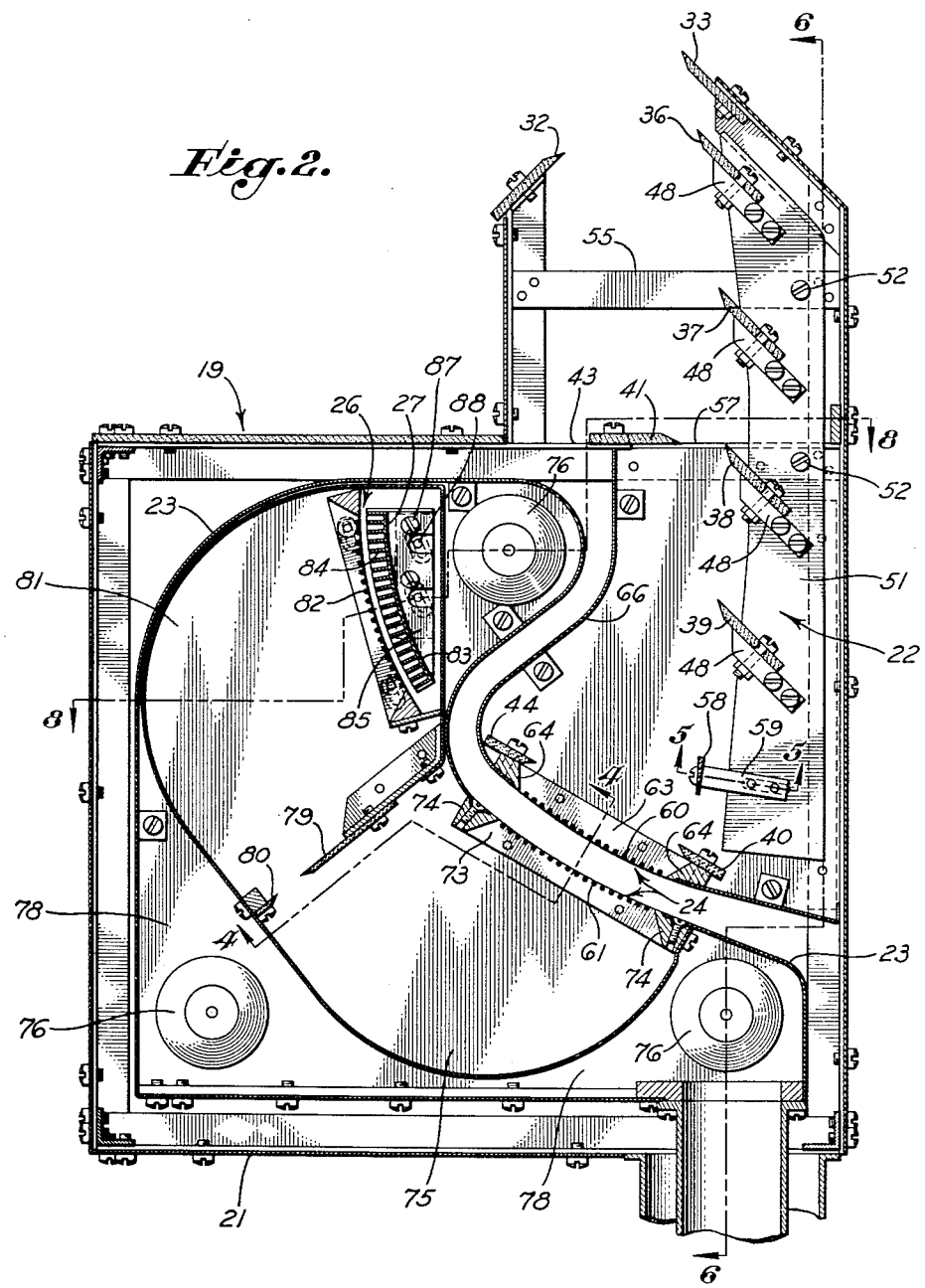
Fig. 2 is a sectional plan view of the receiver unit.

The calutron disclosed herein is of the general type disclosed in the application for United States Letters Patent of Ernest O. Lawrence, Serial No. 557,784, filed October 9, 1944, for "Methods of and Apparatus for Separating Materials," now Patent No. 2,709,222, and employs certain features of the calutrons disclosed in the applications for United States Letters Patent of Stanley P. Frankel, Serial No. 613,357, filed August 29, 1945; William E. Parkins, Serial No. 645,455, filed February 4, 1946; and Kenneth R. MacKenzie, Serial No. 645,457, filed February 4, 1946, and now abandoned. Inasmuch as the above-mentioned application of Ernest O. Lawrence contains a complete description of all of the operative parts of a calutron, only such calutron parts will be disclosed in detail herein as seems necessary or desirable for understanding the instant invention.

The presently preferred embodiment of a calutron includes a tank 10, rectangular in plan, that is mounted between the pole faces 11 of a calutron magnet. In the present instance, the pole faces of the magnet are vertically spaced apart, and only the lower pole face is illustrated. The arrangement of the pole faces is such that the direction of the magnetic field permeating the tank 10 is perpendicular to the plane of Fig. 1 of the drawing, the field being directed upwardly. The interior of the tank 10 is connected by a conduit 12 to suitable pumping apparatus 13 for maintaining a desired low pressure within the tank. Within the tank a source unit 14 is provided, including a source block 15 that is mounted upon a wall of the tank and contains apparatus for producing ionized particles of a polyisotope for withdrawal through an exit opening 16 by means of a pair of spaced apart accelerator electrodes 17. As illustrated in Fig. 11, the source block 15 is maintained at a high positive potential, while the accelerating electrodes 17 are maintained at ground potential, whereby positive ions formed within the source block 15 are withdrawn to form an ion beam, indicated schematically at 18, directed toward a receiver unit 19.

As previously explained, the operation of the accelerating device and of the source unit creates a beam that diverges through the first 90° of arcuate travel from a linear virtual focus, and then converges toward a region of focus located approximately 180° from the source unit. Beyond the 180° region of focus, the beam is again divergent. In this 180° region of focus, the composite beam of the polyisotopic material has become at least partially separated into individually focused beam components, the individual foci being separated in accordance with the masses of the particles comprising the components. For example, if normal uranium is employed as the charge material in the source unit 14, the uranium ion beam is made up of components of $U^{234}$, $U^{235}$ and $U^{238}$ ions, with their respective foci spaced from left to right in the order named, as viewed in Fig. 1. Because the $U^{234}$ component is extremely small when compared with the $U^{235}$ and $U^{238}$ components of the beam, it is generally disregarded in operations designed to collect a sample of uranium enriched either with respect to $U^{235}$ or $U^{238}$.

In accordance with the instant invention, the ion beam 18 of positive uranium ions is subjected to both a momentum separation and an energy separation for the purpose of collecting material enriched with respect to the $U^{235}$ isotope. As previously explained, the momentum separation is obtained by virtue of the combined effects of the accelerating potential and of the magnetic field on the positive ions of the beam so that the ions of different mass, that is, the ions of different isotopes, tend to become segregated adjacent the 180° region of focus. As explained in the above noted application of William E. Parkins, Serial No. 645,455, the arcuate paths of the ions of a given mass (all of which paths are segments of circles of the same diameter) become internally tangent to an imaginary circular cylinder that is twice the diameter of the arcuate ion paths and the axis of which is coincident with the linear virtual focus of the beam at the source unit 14. The locus of the points of tangency for given angles of divergence of the ions to either side of a median path at the source unit will be a segment of the imaginary cylinder subtending angles to either side of the 180° focus position equal to the angles of divergence at the source unit. The paths of all of the ions of greatest mass ($U^{238}$) will be internally tangent to the same imaginary cylinder having a predetermined diameter, while the paths of ions of a lesser given mass (for example, $U^{235}$) will all be internally tangent to a concentric imaginary cylinder having a slightly smaller diameter, the percentage difference in these diameters depending solely upon the mass difference of the respective ion components of the beam. By effecting a beam delimiting or shaving operation adjacent the 180° region of focus a delimited portion of the beam rich in the $U^{238}$ isotope to be rejected may be trapped while permitting the remainder of the beam rich in the $U^{235}$ isotope to be collected to pass beyond the 180° region of focus for a further separation based upon energy considerations.

The energy separation of the ions is accomplished in one or more ion decelerating regions in which the ions are subjected to decelerating forces such that only ions having energies within predetermined ranges can pass therethrough. In this way, ions having less than the desired energy are rejected while ions having energies in the desired range are allowed to pass through the decelerating regions with reduced energies for subsequent collection. This results in rejection of those ions of greater mass than the ions desired for collection which, for some reason, arrive at the 180° region of focus with less than their full energy. In the present case, for example, the portion of the beam at the 180° region of focus in which the $U^{235}$ ions are concentrated also contains a large number of $U^{238}$ ions which do not have full energy, either because of a loss of energy from collisions or because, for some reason, the ions did not receive full energy from the accelerating device at the ion source unit.

Thus, the instant invention contemplates the removal of the larger part of the undesired $U^{238}$ ions of the beam by effecting a beam delimiting or shaving step, and subsequent subjection of the delimited beam to one or more decelerating steps to effect an energy separation of the ions, whereby the ions finally reaching a collecting surface have been selected by the sequential actions of two types of separation systems and have been reduced in energy to the point where they may readily be trapped on a collecting surface. In this way, portions of an element rich in a desired or selected isotope, i. e., with a high degree of enhancement with respect to that isotope, can be segregated in the receiver for separate recovery.

Referring to Figs. 1 and 3, the receiver unit 19 includes an outer casing 21 which may be suitably supported within the tank 10 and is maintained at the same ground potential. Within the casing 21 there is provided a beam delimiting vane system 22 forming part of the momentum separation system, and an inner housing or shield 23 forming part of the energy separation system and enclosing a collector 27 upon which the enriched material to be collected is ultimately deposited.

The beam delimiting vane system includes a pair of vertically disposed beam defining vanes 32 and 33, suitably secured to the front end walls of the receiver housing with their longitudinal axes disposed vertically and parallel to the direction of the magnetic field. The vanes 32 and 33 are preferably formed of some bombardment-resistant material, such as graphite. The vanes 32 and 33 serve as general beam defining vanes for intercepting side bands and widely scattered material. The portion of the beam passed by the vanes 32 and 33 is further delimited by other delimiting vanes of the system, which will now be described.

As previously noted, the orbital paths of the ions of a given mass are internally tangent adjacent the 180° region of focus to a circular cylindrical surface twice the diameter of these ion paths, the locus of tangency extending the same angular distance along the cylindrical surface to either side of the 180° focal position as the angular divergence of the ion beam at the source. Thus a series of ion intercepting or shaving vanes 36, 37, 38, 39, and 40 are disposed on the outer or high-energy side of the beam path through a portion of the receiver 19, and a single ion intercepting vane 41 is disposed on the inner or low-energy side, directly opposite the intermediate vane 38. These vanes are all formed of a suitable bombardment-resistant material and are disposed with their longitudinal axes parallel to the magnetic field.

The single ion intercepting vane 41 is independently suitably secured adjacent its opposite ends to upper and lower angle braces 42 and 43 of the receiver casing 21, while the first four vanes 36 through 39 of the series of vanes are similarly secured adjacent their opposite ends to upper and lower vane supporting blocks 48 by suitable fastening elements, and the supporting blocks 48 are in turn suitably secured to respective top and bottom supporting plates 50 and 51. The supporting plates 50 and 51 are respectively secured by fastening screws 52 to top cross pieces 54 and 56 and bottom cross pieces 55 and 57 of the outer casing 21, the cross pieces 56 and 57 being extensions of the angle braces 42 and 43, respectively. The supporting blocks 48 are formed of a suitable electrical insulating material, such as "Lavite."

A graphic monitoring vane or electrode 58 is disposed between the shaving vanes 39 and 40 and is supported similarly to the vanes 36 through 39 by means of upper and lower insulator supporting blocks 59. The monitoring electrode 58 is located with reference to the shaving vanes 39 and 40 so that a portion of the ions which pass the vane 39 and would normally impinge upon the vane 40 are intercepted by the electrode 58, whereby electrons flowing to the electrode to neutralize the ions striking it provide an electrical current useful as an indication of the adjustment of the beam. The nature of the beam controlling function exercised by the monitoring electrode 58 will be described hereinafter.

The fifth shaving vane 40 of the series of shaving vanes, and an oppositely disposed auxiliary defining vane 44 are both individually mounted in any suitable manner upon the framework of a portion of the first decelerating apparatus 24.

As noted above, the delimited portion of the ion beam passed by the shaving vane system again becomes divergent beyond the 180° region of focus. While the ions are never traveling along strictly parallel paths, there is a sufficient uniformity of the ion paths with respect to a given radius of curvature of the beam so that they are substantially normal at any point along the beam to a cylindrical surface having the same radius of curvature. Advantage of this circumstance is taken in performing a first deceleration step by providing a pair of grids 60 and 61 having appropriate cylindrical curvatures to be disposed in spaced-apart relation substantially normal to the paths of ions passed by the shaving vane system. These grids are maintained at suitably different potentials for creating a first ion decelerating region 24 therebetween. Neutral particles (de-ionized beam particles) scattered or sputtered in random directions from the shaving vanes and associated receiver structure, pass in appreciable concentration through the grids 60 and 61 along straight-line paths without being affected by the ion decelerating region 24.

The grid 60 includes top and bottom frame pieces 62 and 63 that extend between a pair of side posts 64 secured along opposite edges of an opening in an internal wall 66 of the outer casing 21. The grid proper is made up of a number of spaced-apart parallel wire extending between the top and bottom frame pieces 62 and 63 in the direction of the magnetic field, the wires and the supporting frame pieces being maintained at the ground potential of the outer casing to which they are secured.

The grid 61 is similarly constructed, and its corresponding supporting frame pieces 72, 73, and 74 are secured to and define an opening into a first chamber 75 of the inner housing or shield 23. The inner housing 23 is mounted on three vertically disposed insulators 76 that are secured to and depend from a top wall 77 of the outer casing 21 and are connected to the bottom wall 78 of the inner housing 23 in supporting relation thereto. Thus, the inner housing 23 is electrically insulated from the outer casing 21, and it and the associated grid 61 may be maintained at a predetermined positive potential with respect to the outer casing 21 and grid 60 for creating the desired decelerating field between the two grids.

Because their energies are reduced while passing through the decelerating region 24, ions entering the chamber 75 of the inner housing 23 follow more sharply curved circular paths that extend between a pair of delimiting vanes 79 and 80 into a second chamber 81, the vanes 79 and 80 being disposed adjacent a second region of crossing of the ion paths, as illustrated most clearly in Fig. 1. The size of the gap between the delimiting vanes 79 and 80 is made sufficiently large for substantially all of the ions of the desired velocity and mass to pass therethrough and small enough so that the vanes intercept most of those neutral particles entering the chamber 75 that may be scattered from the walls thereof toward the chamber 81 containing the collector 27.

At approximately 180° from the first decelerating region 24, a second decelerating region 26 is provided that is defined by the collector 27 and a grid 82, structurally similar to the grids 60 and 61 and similarly mounted. The grid 82 is maintained at the potential of the grid 61 and of the inner housing 23 so that ions following paths of reduced radius travel through a substantially field-free space between these two grids.

The collector 27 (Figs. 7 through 10) comprises a metallic back plate 83 having a plurality of vertically disposed ion trapping vanes or blades 84 integrally connected to the back plate and extending in the direction of the magnetic field for defining pockets within which the ions to be collected may be trapped. The back plate 83 is provided with top and bottom flanges 85 that are respectively secured between suitable insulating blocks 86 by a plurality of screws 87, the insulating blocks being respectively secured to the top and bottom walls of the inner housing 23 by a corresponding plurality of screws 88.

The collector 27 is preferably maintained at a more positive potential than the inner housing 23 and grid 82 so that the second decelerating region 26 is maintained between the collector and this grid. The potential of the collector 27 is preferably set slightly lower than that of the source unit 14 but above the potential of the grid 82 so that only ions having energies within a predetermined maximum range can pass through the final decelerating region 26. On passing through this final decelerating region 26, the ions lose most of their remaining energy and strike the collector 27 at such a slow speed that they adhere thereto and may be subsequently recovered at the conclusion of a collection run. The second deceleration may be dispensed with, if desired, by increasing the decelerating potential between the first two grids 60 and 61 and by eliminating the last grid 82 and/or maintaining the collector 27 at the potential of the inner housing 23. However, superior results are obtained by employing at least two deceleration stages.

Fig. 11 illustrates a suitable wiring diagram for maintaining the electrical potentials required and referred to above. The circuit includes a conventional D. C. voltage supply unit 91 that is connected between the inner housing 23 of the receiver 19 and the anode supply of the source unit 14, and a second conventional D. C. voltage supply unit 92 that is connected between the collector 27 of the receiver and the anode supply of the source unit. A milliammeter 93, suitably protected in a conventional manner, is connected in the line from the voltage supply unit 92 to the collector 27 for reading current to the collector, which current is a measure of the rate of ion reception by the collector. A double throw switch 94 is interposed in the positive and negative lines from the D. C. voltage supply unit 92 for reversing the polarity of this supply unit for a purpose described hereinafter, the normal position of the switch 94 being such as to connect the negative terminal of the supply unit to the collector 27 and the positive terminal to the source unit anode supply.

A milliammeter 95 is provided in a line running from the monitoring electrode 58 to ground for indicating current flowing to the electrode. When this current is maximized, it indicates that the beam accelerating voltage at the source unit 14 is at the proper value for the shaving vanes 36 through 40 to intercept the desired portion of the $U^{238}$ component of the beam.

In order to obtain a proper check upon general beam conditions and upon the alignment of the beam with respect to the receiver 19, it is also desirable that suitable equipment be provided for selectively reading the currents to the various shaving vanes 36 through 39 individually and for reading the total collective current thereto. This may conveniently be accomplished by means of a suitable rotary switch 96, or the like, interposed in lines leading from the several shaving vanes through a milliammeter 97 to ground, whereby the current to any one of these vanes, or the total current to all of them, may be selectively run through this meter 97.

In order to obtain an additional check on general beam conditions while preventing ions from reaching the collector 27, a switch 98 is provided, by means of which the positive lines from the two D. C. voltage supply units 91 and 92 may be run to ground through a milliammeter 99 instead of to the source unit anode supply. In this manner, the potentials of the inner housing 23 and of the collector 27 may be dropped from their normal values above ground potential to values somewhat below ground potential (or at ground potential if the voltage supplies from the units 91 and 92 are cut off), and ions passed by the shaving vane system 22 will be permitted to travel directly into the first chamber 75 of the inner housing 23 without being decelerated. Such ions will, therefore, continue along their original arcuate paths until they are deionized by striking a wall of the first chamber 75, and most of them will be retained in the chamber 75 after deionization therein without ever reaching the second chamber 81 or the collector 27. In effect, this converts the receiver to one of the "full-energy" type by making the above-described energy separation system inoperative, and the meter 99 will then record the current resulting from neutralization of all ions passed by the shaving vane system 22 into the inner housing 23.

As an alternative to converting the receiver to the full-energy type for preventing ions from reaching the collector 27, the double-throw switch 94 may be operated to reverse the polarity of the D. C. voltage supply unit 92, thereby raising the potential of the collector 27 to a value above the potential of the source unit 14 sufficiently to reject all ions that would otherwise pass through the last grid 82 and strike the collector. When this is done, ions normally passing along arcuate paths of reduced radius through the first chamber 75 of the inner housing 23 to the collector 27 in the second chamber 81, will be turned back in the second decelerating region 26 before reaching the collector but will, for the most part, be trapped within the second chamber 81.

By means of a switch 100 disposed in one of the A. C. leads to the D. C. voltage supply unit 91, the operation of this unit may be individually cut out, thereby connecting the inner housing 23 through the resistance of the unit 91 to the source anode supply for maintaining the inner housing substantially at the potential of the source block 15. As explained in more detail hereinafter, this causes substantially all ions approaching the decelerating region 24 to be turned back before passing through the second grid 61 into the inner housing 23.

The currents normally read on the ammeters 95, 97, and 99 may be selectively individually passed through one sweep circuit of an oscilloscope 101 by means of a suitable rotary switch 102, or the like, the oscilloscope being conveniently connected for its other sweep circuit to the source voltage regulator.

To summarize briefly the mode of operation of the above-described receiver 19 for collecting the $U^{235}$ isotope of uranium, the ion beam 18 is subjected adjacent its 180° region of focus to a shaving operation by the vane system 22 so as to pass only a portion of the beam richest in the $U^{235}$ isotope beyond the 180° region of focus. The position of the monitoring electrode 58 is such that, when the beam is properly focused for the shaving operation, the current to this electrode is a maximum; and the accelerating voltage at the source unit 14 may be adjusted during a run to maintain the maximum current to the electrode 58.

After the delimited portion of the beam passed by the vane system 22 again becomes divergent beyond the 180° region of focus, it is subjected to a first deceleration while passing through the decelerating region 24. Assuming an accelerating potential at the source unit 14 of, say, 15 kilovolts, the second grid 61 could be maintained at, say, 14 kilovolts, whereby ions reaching the first decelerating region 24 with less than 14 kilovolts of energy would be rejected and turned back before passing the grid 61.

As a result of this decelerating action, only ions having energies in the range of 14 to 15 kilovolts will pass through the grids 60 and 61 into the inner housing or shield 23 and will travel along arcuate paths of reduced radius toward the collector 27. The collector is maintained at a still more positive potential, say 100 volts less than the source block potential of 15 kilovolts, so that a second deceleration of approximately 900 volts is effected in the decelerating region 26; and only those ions that approach the grid 82 with energies in the range 900 to 1000 volts will pass through the decelerating region 26 and impinge upon the collector 27, by which they are de-ionized and retained for subsequent recovery.

During normal operation, while the beam is properly focused, a substantial quantity of material will strike the edges of the various beam delimiting and shaving vanes and the wires of the various grids and be scattered at random therefrom after being deionized thereby. A considerable portion of this scattered material will normally pass through the first decelerating region 24 and into the first chamber 75 of the inner housing 23. Similarly, a substantial quantity of material will be scattered from the edges of the delimiting vanes 79 and 80 and from the grid 82 within the inner housing 23, and a considerable portion of this material will ultimately be trapped within the second chamber 81. Because of the quantity of $U^{238}$ material trapped by the shaving vane system 22, material entering the first chamber 75 and material entering the second chamber 81, but failing to reach the collector 27, will normally be substantially enriched with respect to the $U^{235}$ isotope. This material may be recovered at the conclusion of a run and advantageously recycled by using it as charge material in the same or a different calutron. Because the material recovered from the second chamber 81 will generally be more highly enriched than that recovered from the first chamber 75, it may be desired in some instances to process separately the material recovered from these two chambers.

During the bake-in period required to bring the pressure within the calutron tank 10 down to the required low value ($10^{-4}$ to $10^{-5}$ mm. Hg), the source unit 14 is put in operation so that the heat generated thereby and by the beam will assist in degassing the tank and the apparatus contained therein. However, since the beam will not be sufficiently uniform for satisfactory reception until the normal operating pressure within the tank has been attained, it is desired that ions be prevented from entering the inner housing 23 until the condition of the beam is satisfactory and it has been properly focused. As noted above, the rejection of all ions approaching the inner housing 23 is accomplished by opening the switch 100 before the beam is created in the tank 10, thereby effecting an electrical connection through the D. C. voltage supply unit 91 from the inner housing 23 to the source anode supply. The potential of the inner housing 23 and of the second grid 61 mounted thereon is thereby maintained substantially at the potential of the source block 15 and 15 kilovolts above the potential of the beam. Thus, ions traveling in the beam with the normal full energy of 15 kilovolts will, on reaching the first decelerating region 24, be completely decelerated and prevented from entering the inner housing 23. Since substantially no current will flow between the inner housing 23 and the source anode supply to which it is connected, the resistance in the D. C. voltage supply unit 91 will have only a negligible effect upon the potential of the inner housing 23.

When the desired low pressure within the tank 10 has finally been attained and a beam satisfactory for collection has been created, the beam may be properly focused with reference to the shaving vane system 22 in accordance with the indicator current to the milliammeter 95 in the manner described above. The condition of the beam may be further checked at this point by manipulating the switch 98 so as to put the inner housing 23 and the collector 27 at or below the potential of the beam, thereby permitting all ions passed by the shaving vane system 22 to travel without deceleration into the first chamber 75 of the inner housing 23, where they are de-ionized. The ratio between the quantity of ions entering the inner housing 23 and the quantity of ions intercepted by the shaving vane system 22, as indicated by the reading of the milliammeter 99 compared to the combined reading of the milliammeters 95 and 97 (when the switches 96 and 102 are appropriately conditioned for this purpose), will provide further information indicative of the effectiveness of the shaving vane system 22 in intercepting the desired portion of the beam. By returning the switch 98 to its normal position in which the positive terminals of the two D. C. voltage supply units 91 and 92 are connected to the source anode supply, normal reception conditions may be restored and maintained for collection purposes throughout the run.

If, during a run, slight refocusing of the beam is required as indicated by the milliammeter reading 95, ions may be temporarily prevented from reaching the collector 27 by operating the double-throw switch 94 to reverse the polarity of the D. C. voltage supply unit 92, thereby raising the potential of the collector 27 above the potential of the source anode supply and creating a decelerating field between the collector and the anterior grid 82 sufficient to turn back all ions entering the decelerating region 26 before they strike the collector 27. The accelerating voltage can then be adjusted until the reading of the milliammeter 95 indicates that the beam has been brought back to a proper focus. During such refocusing, material substantially enriched with respect to the $U^{235}$ isotope that continues to enter the inner housing 23, is trapped in the chambers 75 and 81, from which it may be recovered for reprocessing as noted above.

Since material entering the inner housing during a run, but failing to reach the collector 27, will normally be enriched with respect to the $U^{235}$ isotope to make its recovery worthwhile, complete rejection of all ions from the inner housing 23 is desired only when the condition of the beam or the focusing of the beam becomes quite bad. While material of the desired degree of enrichment may be obtained at the conclusion of a run only from the collector 27, material recovered from the walls of the first chamber 75 will normally be sufficiently enriched to justify its recovery for recycling purposes, and material recovered from the walls of the second chamber 81 will have a somewhat greater enrichment factor that may justify its separate recovery for recycling in still another stage of operation from that in which material from the first chamber 75 is processed.

Figure 12:
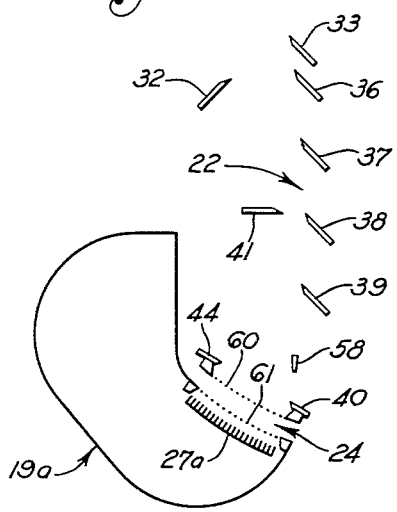
Figs. 12 through 15 are diagrammatic views illustrating various arrangements of the ion decelerating apparatus of the receiver unit with both single and double stages of deceleration, and various positions of the ion collector.

Figs. 12 through 15 indicate schematically various modified forms of the above-described receiver, Fig. 12 showing a receiver 19a in which a collector 27a is disposed immediately behind the grids 60 and 61. With this arrangement, as in the case of the above-described embodiment of the invention, two decelerating steps may be performed. However, in the present instance no provision is made for positioning the collector out of the paths of neutral particles not affected by the calutron magnetic field or by the decelerating potentials employed. On the other hand, the percentage of the material passing through the first decelerating region that reaches the collector will be substantially greater than in the case of the above-described embodiment of the invention, though of a somewhat lower enhancement with respect to the $U^{235}$ isotope sought to be collected.

Figure 13:
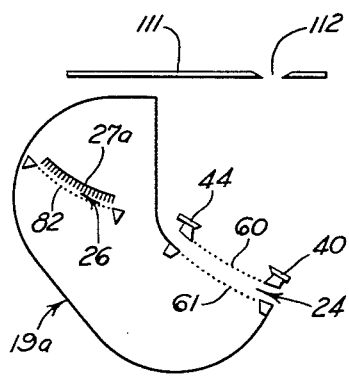

Fig. 13 is similar generally to the first-described receiver except that the vane system 22 is replaced by a beam viewing face 111 having an opening 112 of the desired width to perform the beam defining function.

Figure 14:
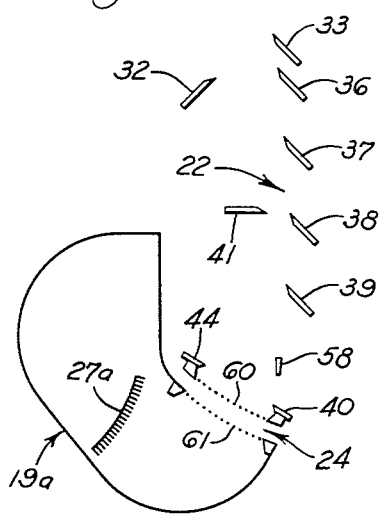
Figure 15:
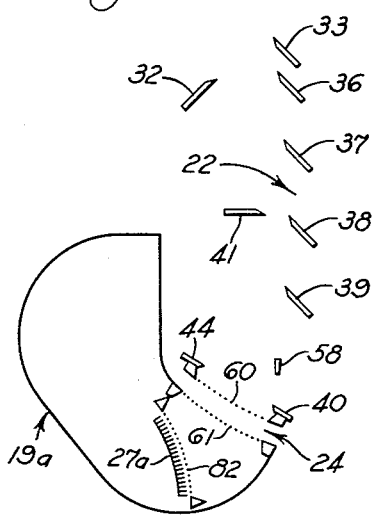
Figure 16:
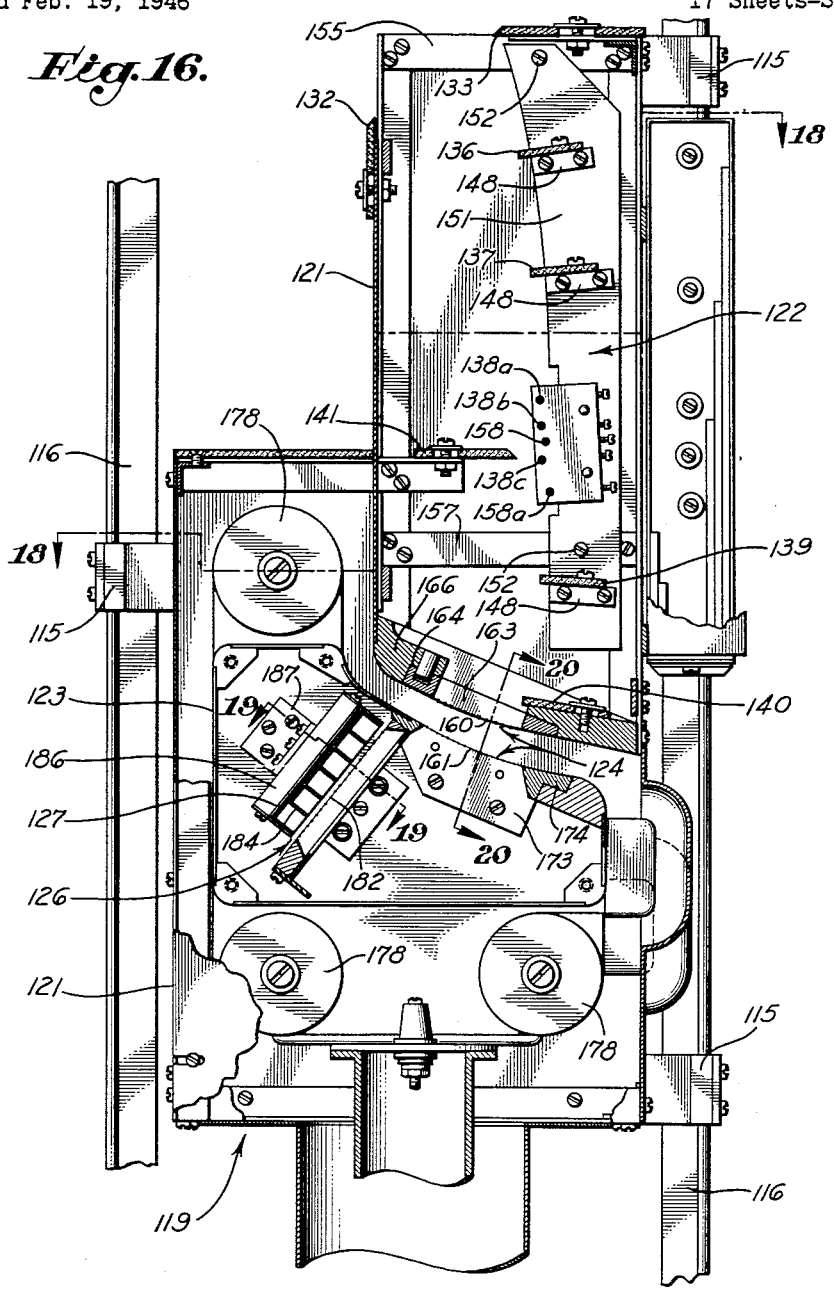
Figure 17:
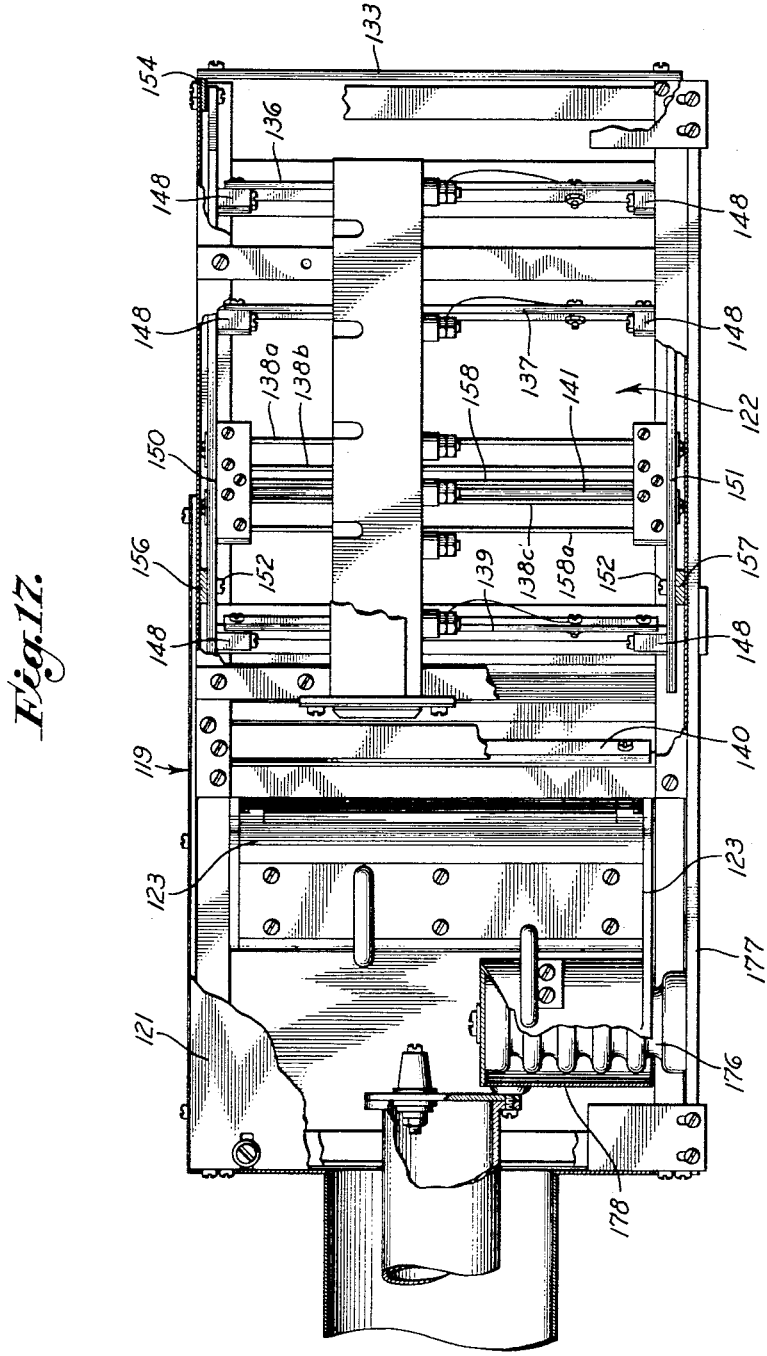
Figure 20:
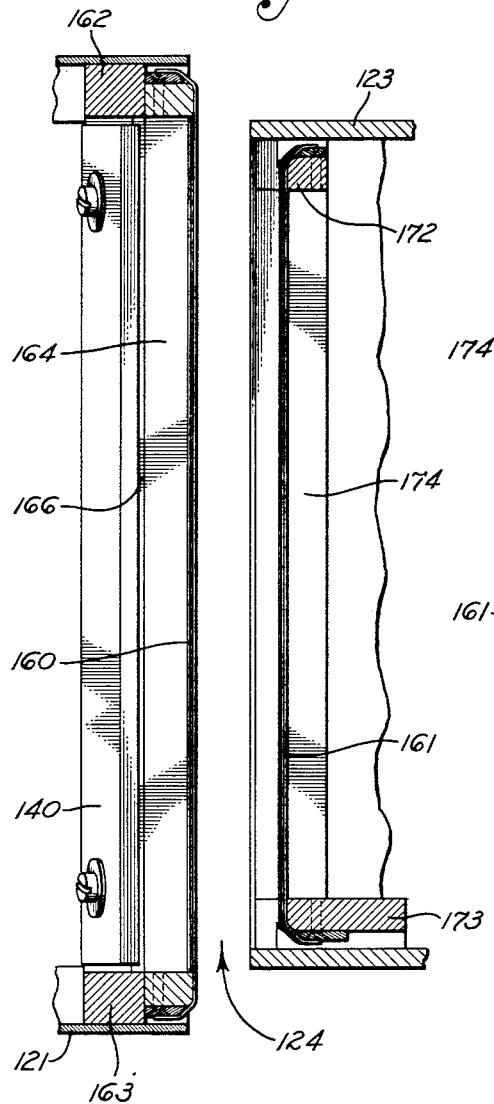
Figure 21:
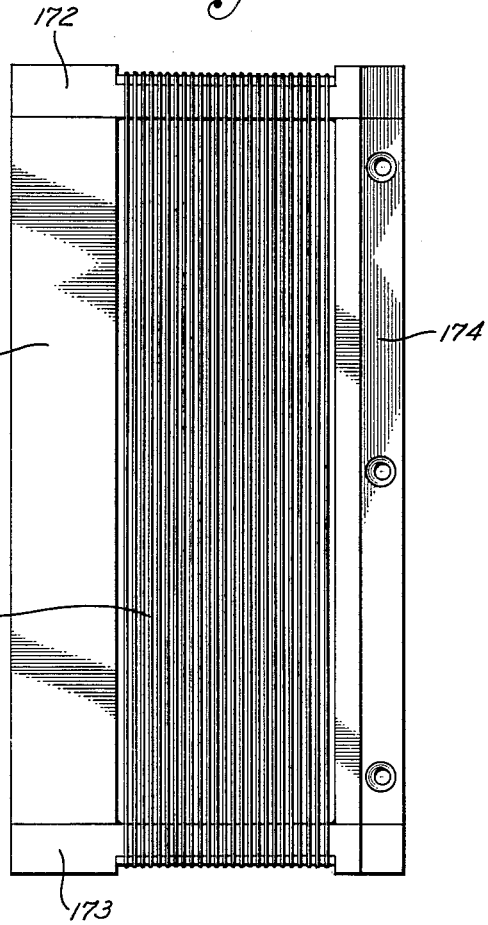
Figure 22:
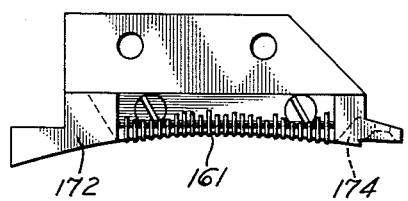
Figure 23:
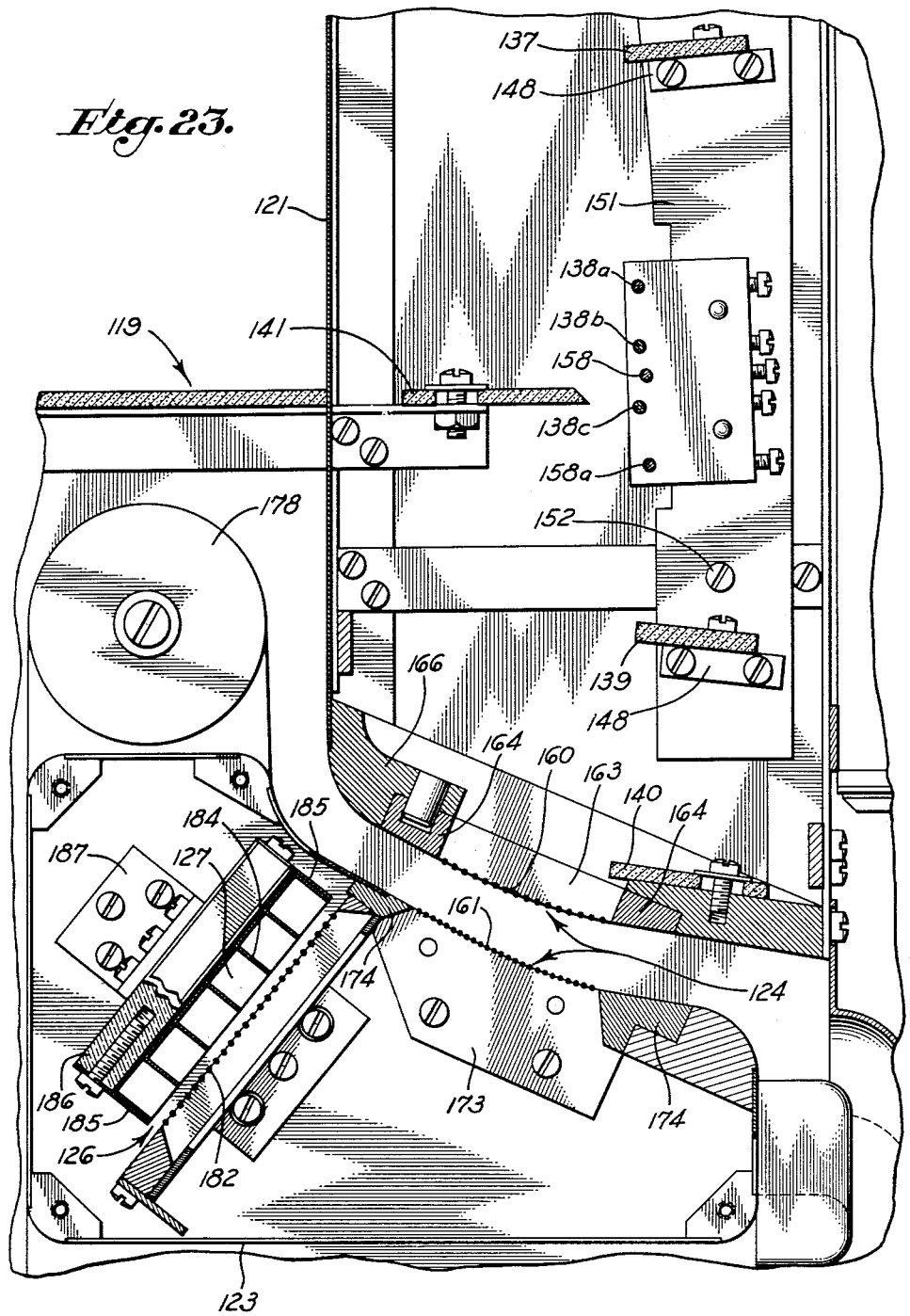

Fig. 14 illustrates schematically the use of a collector disposed 90° from the decelerating apparatus 24 with provision for only a single deceleration, while Fig. 15 shows the second decelerating means and collector in a position substantially 45° from the first decelerating means with provision for two deceleration steps.

Figs. 16 through 23 illustrate a modified form of receiver, similar to that first described herein, but of a more compact construction. The receiver unit 119 includes an outer casing 121 that may be suitably supported within the tank 10 by means of sliding blocks 115 engaging tracks 116 whereby the position of the receiver along the tracks may be adjusted with reference to the position of the 180° region of focus of the beam 18. Within the outer casing 121 there is provided a beam delimiting vane system 122 and an inner housing or shield 123 associated with a first decelerating apparatus 124 and containing a second decelerating apparatus 126, the latter including a collector 127. The outer casing 121 and track structure 116 are maintained at ground potential.

The beam delimiting vane system 122 includes three vertically disposed beam defining vanes 132, 133, and 141 that are secured to the receiver housing and serve as general beam defining vanes similar to the vanes 32, 33, and 41 of the first-described receiver for admitting a portion of the beam to be further delimited by a number of associated beam shaving vanes, presently to be described, all of the vanes being formed of a suitable bombardment resistant material and being disposed with their longitudinal axes parallel to the magnetic field.

The beam shaving vanes include seven vanes 136, 137, 138a, 138b, 138c, 139, and 140 that are disposed along the outer or high-energy side of the beam path through a portion of the receiver. The shaving vanes 136, 137, and 139 are structurally similar to each other and are similarly secured adjacent their opposite ends, respectively, to upper and lower vane supporting blocks 148 by suitable fastening elements; and the supporting blocks 148 are in turn suitably secured to respective top and bottom supporting plates 150 and 151. The supporting plates 150 and 151 are respectively secured by fastening screws 152 to top cross pieces 154 and 156 and bottom cross pieces 155 and 157 of the outer casing 121. The supporting blocks 148 are formed of a suitable electrical insulating material such as "Lavite." The vanes 138a, 138b, and 138c, adjacent the center of the vane system, also employed as shaving vanes, are in the form of rods, while a pair of rod type electrodes 158 and 158a are employed as monitoring vanes or electrodes. This type of shaving and monitoring system is disclosed and claimed in my copending application, Serial No. 645,455.

The first deceleration step in this receiver is accomplished by a pair of grids 160 and 161 (Figs. 16, 20, and 23) that are spaced apart to form a first decelerating apparatus 124. The grid 160 includes top and bottom frame pieces 162 and 163 that extend between a pair of side posts 164 secured along opposite edges of an opening in an internal wall 165 of the outer casing 121 and grounded thereto. The grid proper is made up of a number of spaced apart parallel wires extending between the top and bottom frame pieces 162 and 163 in the direction of the magnetic field. The grid 161 is similar to the grid 160 and its corresponding supporting frame pieces 172, 173, and 174 are secured to and define an opening leading into the inner housing or shield 123.

The inner housing 123 is mounted on three vertically disposed insulators 176 that are secured to and extend upwardly from a bottom wall 177 of the outer casing 121 into cup-shaped wall portions 178 of the inner housing 123, to which they are also secured. Thus, the inner housing 123 is electrically insulated from the outer casing 121, and it and the associated grid 161 may be maintained at a desired positive potential with respect to the outer casing 121 and grid 160 for creating the desired decelerating field between the two grids.

Ions which have been decelerated by passing through the first decelerating apparatus 124 will follow more sharply curved circular paths within the inner housing 123. At approximately 90° along these paths from the first decelerating apparatus 124, a second decelerating apparatus 126 is provided comprising the collector 127 and a grid 182 that is structurally similar to the grids 160 and 161 and is similarly mounted. The grid 182 is maintained at the potential of the grid 161 and of the inner housing 123 so that ions following paths of reduced radius between these two grids travel through a substantially field-free space.

The collector 127 (Figs. 19 and 23) comprises a metallic back plate 183 having a plurality of vertically disposed ion trapping vanes or blades 184 integrally connected to the back plate and extending in the direction of the magnetic field for defining pockets within which the ions to be collected may be trapped. The back plate 183 is also provided with oppositely disposed side flanges 185 that are secured to a suitable insulating block 186 carried by a bracket 187 mounted on the bottom of the inner housing 123, whereby the collector is electrically insulated from the inner housing.

The collector 127 is maintained at a more positive potential than the inner housing 123 and the grid 182 for creating a second decelerating region between the collector and this grid. The potential of the collector 127 is chosen but slightly lower than that of the source unit 14 so that only ions having energies within a predetermined energy range can pass through the final decelerating region defined by the decelerating apparatus 126. On passing through this final decelerating region, the ions lose most of their remaining energy and strike the collector 127 at such a slow speed that they adhere thereto and may be subsequently recovered at the conclusion of a collection run.

Figs. 24 through 30 illustrate another modified form of receiver similar to that first described herein but designed particularly for collecting the $U^{234}$ isotope from a source material of normal uranium.

Figure 24:
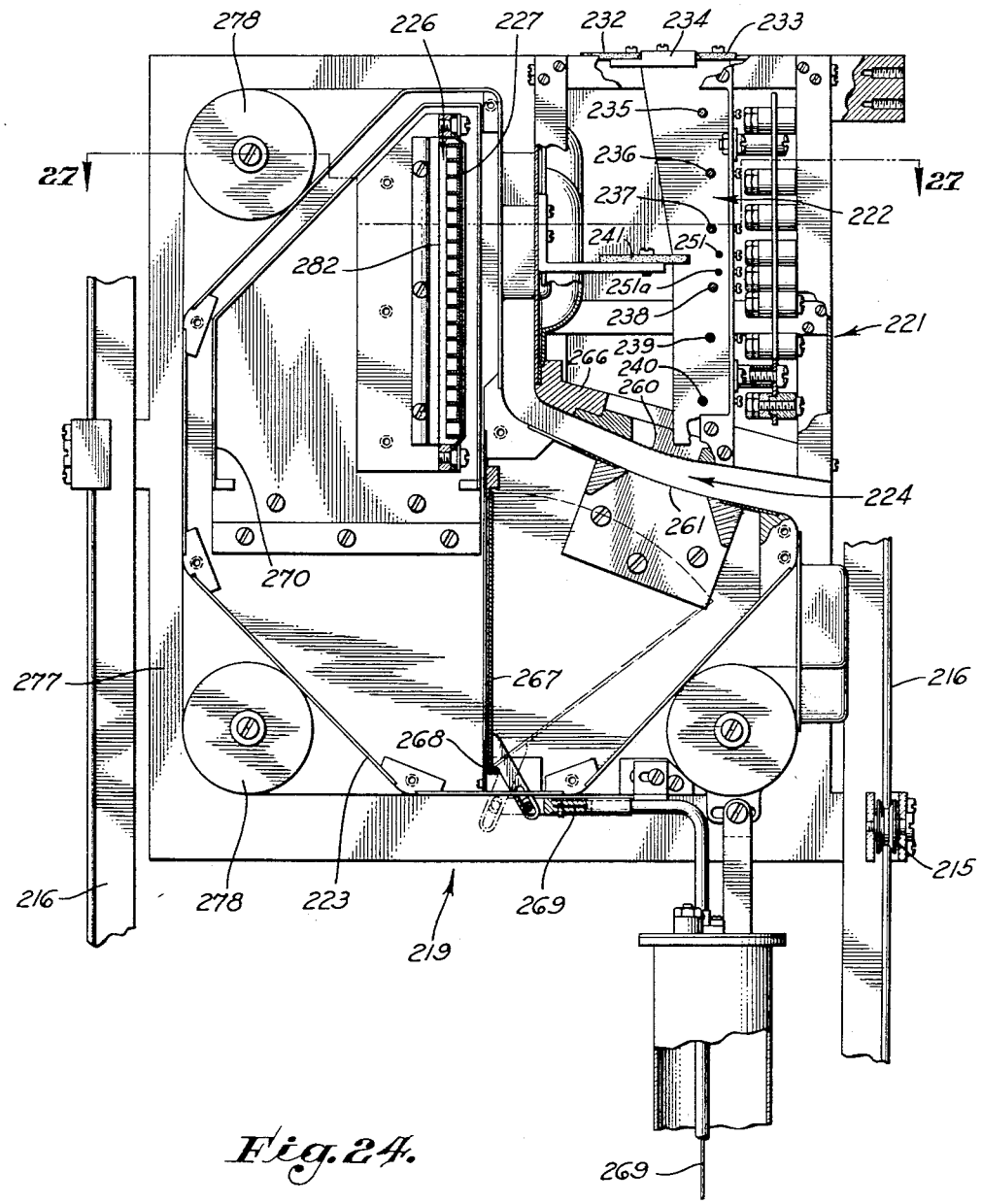
Figure 25:
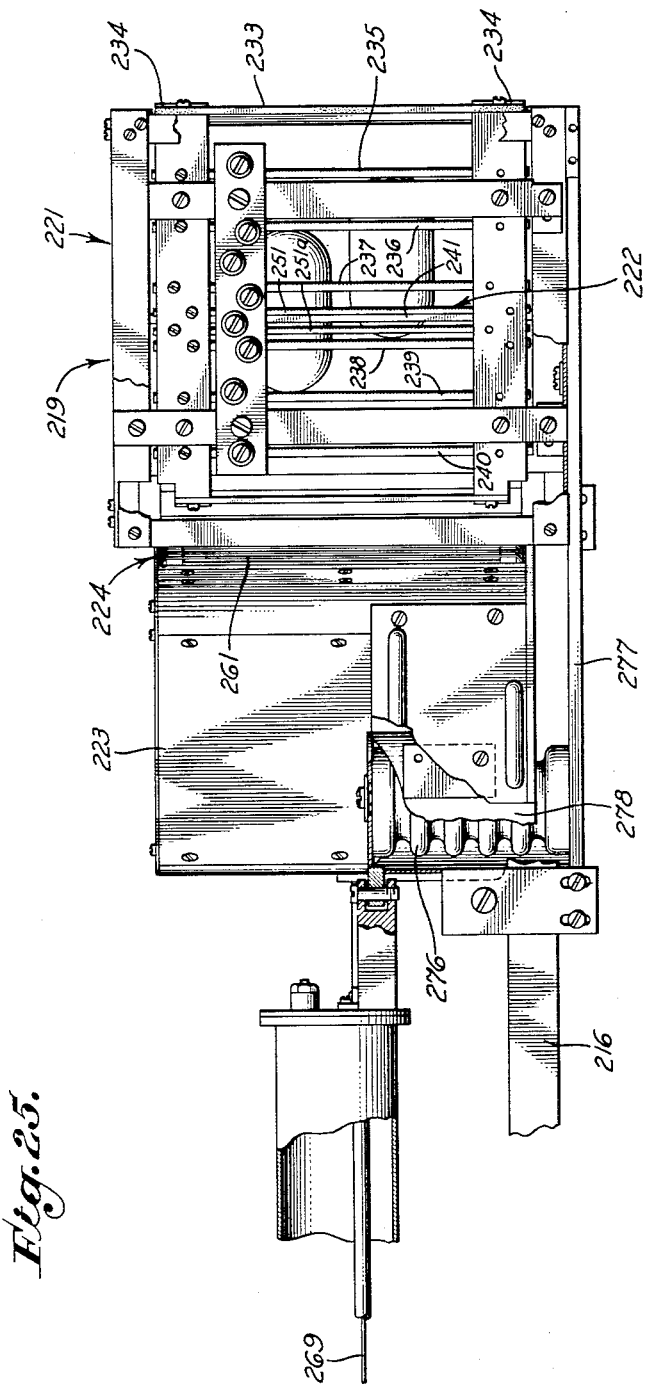
Figure 26:
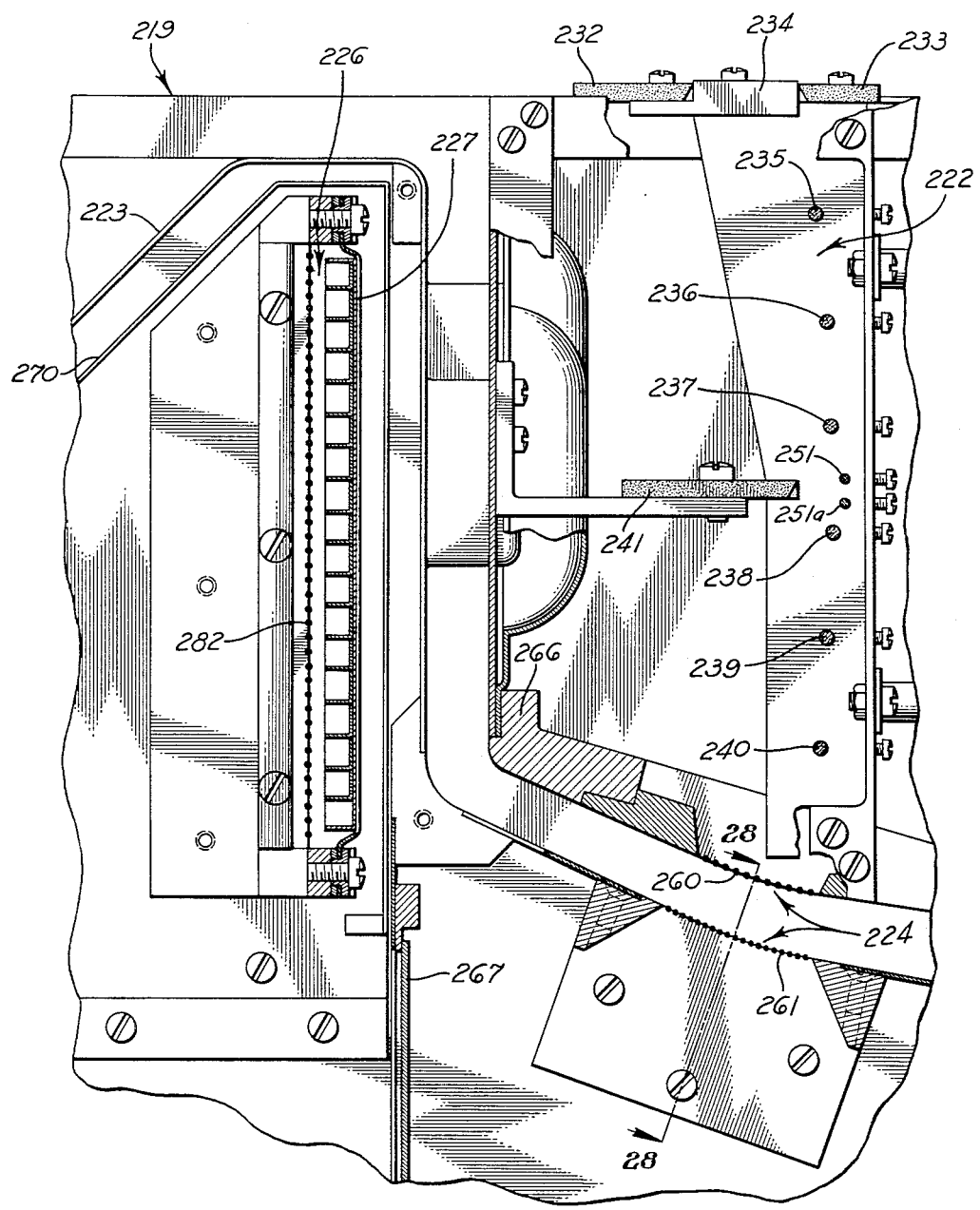

Referring to Fig. 24, the receiver unit 219 includes an outer casing 221 that may be suitably supported within the tank 10 by means of rollers 215 engaging tracks 216, the outer casing and the track structure being maintained at ground potential. Within the outer casing 221 there is provided a beam delimiting vane system 222 and an inner housing or shield 223 associated with a first decelerating apparatus 224 and containing a second decelerating apparatus 226, the latter including a collector 227.

The beam delimiting vane system includes three vertically disposed, blade type, beam defining vanes 232, 233, and 241 that are secured to the outer casing 221 and serve as general beam defining vanes similar to the vanes 32, 33, and 41 of the receiver illustrated in Figs. 1 through 11. A pair of blocks 234, respectively disposed between opposite ends of the vanes 232 and 233, maintain these vanes in accurately spaced relation for admitting a sharply defined portion of the beam for further delimiting by a number of associated beam shaving vanes presently to be described. All of the vanes are formed of a suitable bombardment resistant material and are disposed with their longitudinal axes parallel to the magnetic field.

The beam shaving vanes include six rod type vanes 235, 236, 237, 238, 239, and 240 (Fig. 26) that are disposed along the outer or high-energy side of the beam path through a portion of the receiver. Between the shaving vanes 237 and 238, two graphite monitoring vanes or electrodes 251 and 251a, of the character disclosed and claimed in my above-mentioned copending application, Serial No. 645,455, are provided for beam monitoring purposes.

The first deceleration step in this receiver is accomplished by a pair of grids 260 and 261 (Figs. 26, 28, 29, and 30) that are spaced apart to form a first decelerating apparatus 224. These grids 260 and 261 are respectively structurally similar to the grids 160 and 161 of the receiver illustrated in Figs. 16 through 23, and are respectively similarly mounted in openings in an internal wall 266 of the outer casing 221 and in an opposite wall of the inner housing 223.

The inner housing 223 is supported by three vertically disposed insulators 276 that are secured to and extend upwardly from a bottom wall 277 of the outer casing 221 into cup-shaped wall portions 278 of the inner housing 223, to which they are also secured. Thus, the inner housing 223 is electrically insulated from the outer casing 221, and it and the associated grid 261 can be maintained at a predetermined positive potential with respect to the outer casing 221 and grid 260 for creating the desired decelerating field between the two grids.

Ions which have been decelerated by passing through the first decelerating apparatus 224 will follow more sharply curved circular paths leading toward the collector 227, the collector being disposed a maximum angular distance along said paths from the first decelerating means 224 so as to reduce to a minimum the contamination of the collector by sputtered or scattered neutral particles.

The collector 227 is generally similar to the collectors 27 and 127 of the two receivers illustrated in Figs. 1 through 11 and 16 through 23, respectively, but is of a greater lateral extent to accommodate the width of the beam pattern at the collector. A grid 282, generally similar to the grids 82 and 182 of the two receivers previously described, but of a greater lateral extent, is disposed ahead of the collector 227 for defining a second decelerating region therebetween. The collector 227 and its associated grid 282 are mounted within an auxiliary collector housing 270, that is in turn mounted within the inner housing 223 and is maintained at the same potential, the collector being insulated from the auxiliary housing.

A door 267 is provided within the inner housing or shield 223 and is hinged at 268, and an operating connection, including a wire 269, leads from the door to the outside of the tank. The door 267 may be moved to its closed position before or at intervals during a collection run to permit adjusting the beam without the possibility of contaminating the collector 227 during the time required for adjustment.

The purpose of the receiver design shown in Figs. 24 through 30 being to collect $U^{234}$, as previously noted, it is desired to employ a beam having a small angular divergence at its source and to provide for very sharp definition in delimiting the beam to exclude $U^{235}$ and $U^{238}$ particles, while passing the portion of the beam richest in $U^{234}$. The path of small width through the shaving vane system 222 and decelerating apparatus 224, therefore, is all that is desired to accommodate the ions to be collected.

Inasmuch as the general mode of operation of both of the deceleration receivers shown in Figs. 24 through 30 to 16 through 23 is similar to that described in connection with the receiver shown in Figs. 1 through 11, this description will not be repeated.

While there has been described what are at present considered to be preferred embodiments of the invention, it is apparent that numerous modifications may be made therein, and it is intended to cover in the appended claims all such modifications as fall within the true spirit and scope of the invention.

What is claimed is:

1. In a calutron having means for projecting a polyisotopic ion beam along an arcuate path toward a region of focus while effecting a momentum separation of beam components of different mass, a vane system disposed adjacent said region of focus for intercepting a selected portion of the beam while passing the remainder thereof beyond said region of focus, and ion decelerating means disposed in the path of said remainder of the beam beyond said region of focus for decelerating ions traveling therein to effect an energy separation thereof.

2. In a calutron having means for projecting a polyisotopic ion beam along an arcuate path toward a region of focus while effecting a momentum separation of beam components of different mass, a vane system disposed adjacent said region of focus for intercepting a selected portion of the beam while passing the remainder thereof beyond said region of focus, first ion decelerating means disposed in the path of said remainder of the beam beyond said region of focus for decelerating ions traveling therein to effect an energy separation thereof, and second decelerating means disposed in the path of ions decelerated by said first decelerating means for effecting a further deceleration and energy separation thereof.

3. In a calutron including means for projecting a polyisotopic ion beam having a predetermined initial angle of divergence along an arcuate path from a source toward a region of focus 180° along said path while effecting a momentum separation of beam components of different mass, said beam being characterized by convergence during the second 90° of its travel toward said region of focus and divergence beyond said region of focus, a receiver for said beam comprising means disposed adjacent said region of focus for intercepting a selected portion of the beam and passing the remainder thereof beyond said region of focus, and electrostatic means disposed in the path of the portion of the beam diverging beyond said region of focus for interrupting the travel of ions having kinetic energies below a selected range while passing ions having kinetic energies within said range.

4. In a calutron including means for projecting a polyisotopic ion beam having a predetermined initial angle of divergence along an arcuate path from a source toward a region of focus 180° along said path while effecting a momentum separation of beam components of different mass, said beam being characterized by convergence during the second 90° of its travel toward said region of focus and divergence beyond said region of focus, a receiver for said beam comprising means disposed adjacent said region of focus for intercepting a selected portion of the beam and passing the remainder thereof beyond said region of focus, first electrostatic means disposed in the path of the portion of the beam diverging beyond said region of focus for interrupting the travel of ions having kinetic energies below a first selected range while passing ions having kinetic energies within said first range, and second electrostatic means disposed in the path of ions passed by said first electrostatic means for interrupting the travel of ions having kinetic energies below a second selected narrower range while passing ions having kinetic energies within said second range.

5. In a calutron including means for projecting a polyisotopic ion beam having a predetermined initial angle of divergence along an arcuate path from a source toward a region of focus 180° along said path while effecting a momentum separation of beam components of different mass, said beam being characterized by convergence during the second 90° of its travel toward said region of focus and divergence beyond said region of focus, a receiver for said beam comprising means disposed adjacent said region of focus for intercepting a selected portion of the beam and passing the remainder thereof beyond said region of focus, first electrostatic means disposed in the path of the portion of the beam diverging beyond said region of focus for interrupting the travel of ions having kinetic energies below a first selected range while passing ions having kinetic energies within said first range, second electrostatic means disposed in the path of ions passed by said first electrostatic means for interrupting the travel of ions having kinetic energies below a second selected narrower range while passing ions having kinetic energies within said second range, and a collector disposed in the path of ions passed by the second decelerating means.

6. In a calutron including a magnetic field and means for projecting a polyisotopic ion beam transversely through said magnetic field along an arcuate path toward a region of focus for effecting a momentum separation of beam components of different mass, beam delimiting means disposed adjacent said region of focus for intercepting a selected portion of the beam while passing the remainder thereof beyond said region of focus, first decelerating means for decelerating said remainder of the beam so that its constituent ions having energies within a first predetermined range are constrained to travel along arcuate paths of reduced radius, and second decelerating means including an ion collector for further decelerating and collecting ions traveling along said paths of reduced radius and having energies within a second predetermined narrower range.

7. In a calutron including a magnetic field and means for projecting a polyisotopic ion beam transversely through said magnetic field along an arcuate path toward a region of focus for effecting a momentum separation of beam components of different mass, a vane system disposed adjacent said region of focus for intercepting a selected portion of the beam while passing the remainder thereof beyond said region of focus, electrostatic means disposed in the path of said remainder of the beam for passing its constituent ions having energies within a first predetermined range while constraining them to travel along arcuate paths of reduced radius, and second electrostatic means including an ion collector disposed in said paths of reduced radius for decelerating and collecting ions traveling along said paths of reduced radius and having energies within a second predetermined narrower range.

8. In a calutron having means for projecting a polyisotopic ion beam along an arcuate path toward a region of focus while effecting a momentum separation of beam components of different mass, means disposed adjacent said region of focus for intercepting a selected portion of the beam while passing the remainder thereof beyond said region of focus, a pair of grids maintained at different electrical potentials and disposed substantially normal to and sequentially in the path of said remainder of the beam for decelerating ions traveling therein to effect an energy separation thereof, and means including a third grid and a collector maintained at different electrical potentials and disposed sequentially in the paths of ions decelerated by said pair of grids for further decelerating and collecting selected ones of the ions decelerated by said pair of grids.

9. In a calutron having means for projecting a polyisotopic ion beam along an arcuate path toward a region of focus while effecting a momentum separation of beam components of different mass, means disposed adjacent said region of focus for intercepting a selected portion of the beam while passing the remainder thereof beyond said region of focus, a first grid and a second grid of cylindrical contour maintained at different electrical potentials and disposed sequentially in the path of said remainder of the beam for decelerating ions traveling therein to effect an energy separation thereof, and means including a third grid and a collector maintained at different electrical potentials and disposed sequentially in the paths of ions decelerated by said first and second grids for further decelerating and collecting ions decelerated by said first and second grids.

10. In a calutron including a magnetic field and means for projecting a polyisotopic ion beam transversely through said magnetic field along an arcuate path toward a region of focus for effecting a momentum separation of beam components of different mass, means disposed adjacent said region of focus for intercepting a selected portion of the beam while passing the remainder thereof beyond said region of focus, a pair of grids maintained at different electrical potentials and disposed sequentially in the path of said remainder of the beam for decelerating ions traveling therein whereby they are constrained to further travel along arcuate paths of increased curvature, and means including a third grid and a collector maintained at different electrical potentials and disposed sequentially in the paths of increased curvature of ions decelerated by said pair of grids for further decelerating and collecting selected ones of the ions decelerated by said pair of grids.

11. In a calutron including a magnetic field and means for projecting a polyisotopic ion beam transversely through said magnetic field along an arcuate path toward a region of focus for effecting a momentum separation of beam components of different mass, means disposed adjacent said region of focus for intercepting a selected portion of the beam while passing the remainder thereof beyond said region of focus, a first grid and a second grid of cylindrical contour maintained at different electrical potentials and disposed sequentially substantially normal to and in the path of said remainder of the beam for decelerating ions traveling therein whereby they are constrained to further travel along arcuate paths of increased curvature, and means including a third grid and a collector maintained at different electrical potentials and disposed sequentially in the paths of increased curvature of ions decelerated by said first and second grids for further decelerating and collecting selected ones of the ions decelerated by said first and second grids.

12. In a calutron having means for projecting a polyisotopic ion beam along an arcuate path toward a region of focus while effecting a momentum separation of beam components of different mass, means disposed adjacent said region of focus for intercepting a selected portion of the beam while passing the remainder thereof beyond said region of focus, a first grid and a second grid disposed sequentially in the path of said remainder of the beam, potential means connected between said first and second grids rendering the latter more positive than the former for decelerating ions traveling therein to effect an energy separation thereof, and means including a third grid and a collector disposed sequentially in the paths of ions decelerated by said first and second grids, said third grid being connected to said second grid, and potential means connected between said third grid and said collector rendering the latter more positive than the former for further decelerating and collecting selected ones of the ions decelerated by said first and second grids.

13. In a calutron including a magnetic field and means for projecting a polyisotopic ion beam transversely through said magnetic field along an arcuate path toward a region of focus for effecting a momentum separation of beam components of different mass, means disposed adjacent said region of focus for intercepting a selected portion of the beam while passing the remainder thereof beyond said region of focus, a first grid and a second grid of cylindrical contour disposed substantially normal to and sequentially in the path of said remainder of the second grids rendering the latter more positive than the beam, potential means connected between said first and former for decelerating ions traveling therein whereby they are constrained to further travel along arcuate paths of increased curvature, and means including a third grid and a collector disposed sequentially in the paths of increased curvature of ions decelerated by said first and second grids, said third grid being connected to said second grid, and potential means connected between said third grid and said collector rendering the latter more positive than the former for further decelerating and collecting selected ones of the ions decelerated by said pair of grids.

14. In a calutron having means for projecting a polyisotopic ion beam along an arcuate path toward a region of focus while effecting a momentum separation of beam components of different mass, means disposed adjacent said region of focus for intercepting a selected portion of the beam while passing the remainder thereof beyond said region of focus, a housing having an opening disposed in the path of said remainder of the beam beyond said region of focus for admitting ions into the housing, ion decelerating means disposed in the path of said remainder of the beam and adjacent said opening for decelerating ions entering the housing, and second decelerating means including an ion collector disposed within said housing for further decelerating and collecting selected ones of the ions admitted into the housing.

15. In a calutron including a magnetic field and means for projecting a polyisotopic ion beam transversely through said magnetic field along an arcuate path toward a region of focus for effecting a momentum separation of beam components of different mass, means disposed adjacent said region of focus for intercepting a selected portion of the beam while passing the remainder thereof beyond said region of focus, a housing disposed in said magnetic field beyond said region of focus and having an opening disposed in the path of said remainder of the beam for admitting ions into the housing, a pair of grids disposed sequentially in the path of said remainder of the beam adjacent said opening and maintained at different potentials for decelerating ions entering the housing whereby they are constrained to further travel along arcuate paths of increased curvature, and means including a collector disposed within said housing in the paths of decelerated ions for collecting selected ones thereof.

16. In a calutron including a magnetic field and means for projecting a polyisotopic ion beam transversely through said magnetic field along an arcuate path toward a region of focus for effecting a momentum separation of beam components of different mass, means disposed adjacent said region of focus for intercepting a selected portion of the beam while passing the remainder thereof beyond said region of focus, a housing disposed in said magnetic field beyond said region of focus and having an opening disposed in the path of said remainder of the beam for admitting ions into the housing, a pair of grids disposed sequentially in the path of said remainder of the beam adjacent said opening and maintained at different potentials for decelerating ions entering the housing whereby they are constrained to further travel along arcuate paths of increased curvature, and means including a collector disposed within said housing in the paths of decelerated ions for further decelerating and collecting selected ones thereof.

17. In a calutron including a magnetic field and means for projecting a polyisotopic ion beam transversely through said magnetic field along an arcuate path toward a region of focus for effecting a momentum separation of beam components of different mass, beam delimiting means disposed adjacent said region of focus for intercepting a selected portion of the beam while passing the remainder thereof beyond said region of focus, a housing disposed in said magnetic field beyond said region of focus and having an opening disposed in the path of said remainder of the beam for admitting ions into the housing, a pair of grids disposed sequentially in the path of said remainder of the beam adjacent said opening and maintained at different potentials for decelerating ions entering the housing whereby they are constrained to further travel along arcuate paths of increased curvature, and means including a collector disposed within said housing in the paths of decelerated ions for further decelerating and collecting selected ones thereof, said collector being positioned so as to be substantially free from bombardment by deionized beam particles scattered from said beam decelerating means and said pair of grids.

18. The method of separating isotopes of a polyisotopic material, comprising establishing an ion beam containing isotopes of the material while subjecting the ion beam to forces effecting a momentum separation of the ions of different isotopes in a region of focus of the beam, delimiting the ion beam to pass a portion thereof rich in a selected isotope, subjecting said portion of the ion beam to a decelerating force to change the radius of curvature thereof to a second region of focus, delimiting said portion at said second region of focus to further enrich said portion, and subjecting said further enriched portion of the ion beam to another decelerating force prior to collection thereof.

References Cited in the file of this patent

UNITED STATES PATENTS 2,370,673    Langmuir _____ Mar. 6, 1945